(12) United States Patent
Kniffler et al.

(10) Patent No.: US 10,921,031 B2
(45) Date of Patent: Feb. 16, 2021

(54) HEAT PUMP WITH A GAS TRAP, METHOD FOR OPERATING WITH A GAS TRAP, AND METHOD FOR PRODUCING A HEAT PUMP WITH A GAS TRAP

(71) Applicant: Efficient Energy GmbH, Feldkirchen (DE)

(72) Inventors: Oliver Kniffler, Sauerlach (DE); Holger Sedlak, Lochhofen / Sauerlach (DE)

(73) Assignee: EFFICIENT ENERGY GMBH, Feldkirchen (DE)

( * ) Notice: Subject to any disclaimer, the term of this patent is extended or adjusted under 35 U.S.C. 154(b) by 119 days.

(21) Appl. No.: 16/114,461

(22) Filed: Aug. 28, 2018

(65) Prior Publication Data

US 2018/0363958 A1 Dec. 20, 2018

Related U.S. Application Data

(63) Continuation of application No. PCT/EP2017/054629, filed on Feb. 28, 2017.

(30) Foreign Application Priority Data

Mar. 2, 2016 (DE) .......................... 10 2016 203410

(51) Int. Cl.
*F25B 30/02* (2006.01)
*F25B 25/00* (2006.01)
(Continued)

(52) U.S. Cl.
CPC ............ *F25B 30/02* (2013.01); *F25B 25/005* (2013.01); *F25B 43/043* (2013.01); *F25B 49/02* (2013.01);
(Continued)

(58) Field of Classification Search
CPC ...... F25B 25/005; F25B 30/02; F25B 43/043; F25B 49/02
(Continued)

(56) References Cited

U.S. PATENT DOCUMENTS

| | | | |
|---|---|---|---|
| 2,986,894 A | 6/1961 | Endress et al. | |
| 3,145,544 A | 8/1964 | Weller | |

(Continued)

FOREIGN PATENT DOCUMENTS

| | | | |
|---|---|---|---|
| CN | 104471332 A | 3/2015 | |
| CN | 204286142 A | 4/2015 | |

(Continued)

OTHER PUBLICATIONS

Japanese language office action dated Oct. 1, 2019, issued in application No. JP 2018-545917.

(Continued)

*Primary Examiner* — Henry T Crenshaw
(74) *Attorney, Agent, or Firm* — McClure, Qualey & Rodack, LLP

(57) ABSTRACT

A heat pump includes a condenser for condensing compressed working vapor, a gas trap coupled to the condenser via a foreign gas feed inlet and including: a housing having a foreign gas feed entrance, a working liquid feed inlet within the housing; a working liquid discharge outlet within the housing, and a pump for pumping off gas from the housing, wherein the housing, the working liquid feed inlet and the working liquid discharge outlet are configured such that during operation, a working liquid flow takes place, within the housing, from the working liquid feed inlet to the working liquid discharge outlet, and wherein the working liquid feed inlet is coupled to the heat pump so as to direct, during operation of the heat pump, working liquid which is colder than a working liquid within the condenser.

13 Claims, 14 Drawing Sheets

(51) Int. Cl.
*F25B 43/04* (2006.01)
*F25B 49/02* (2006.01)

(52) U.S. Cl.
CPC ..... *F25B 2339/047* (2013.01); *F25B 2600/13* (2013.01); *F25B 2700/195* (2013.01); *F25B 2700/21163* (2013.01); *Y02B 30/70* (2013.01)

(58) Field of Classification Search
USPC ...................................................... 62/238.7
See application file for complete search history.

(56) References Cited

U.S. PATENT DOCUMENTS

| | | | |
|---|---|---|---|
| 3,620,038 A | 11/1971 | Muench | |
| 3,664,147 A * | 5/1972 | Blackmon | F25B 43/043 62/85 |
| 4,169,356 A * | 10/1979 | Kingham | F25B 7/00 62/335 |
| 4,267,705 A | 5/1981 | Leonard et al. | |
| 5,031,410 A | 7/1991 | Plzak et al. | |
| 5,261,246 A * | 11/1993 | Blackmon | F25B 43/043 62/475 |
| 5,313,805 A * | 5/1994 | Blackmon | F25B 43/043 62/195 |
| 5,520,008 A | 5/1996 | Ophir et al. | |
| 6,698,221 B1 * | 3/2004 | You | F25B 41/00 62/196.4 |
| 10,190,808 B2 | 1/2019 | Jandal et al. | |
| 2006/0025393 A1 | 2/2006 | Liao et al. | |
| 2007/0164152 A1 | 7/2007 | Anderson et al. | |
| 2007/0245759 A1 | 10/2007 | Sedlak et al. | |
| 2009/0100857 A1 | 4/2009 | Ophir et al. | |
| 2016/0054040 A1 * | 2/2016 | Jonsson | F25B 45/00 62/115 |
| 2017/0307269 A1 * | 10/2017 | Gu | F25B 43/003 |
| 2018/0283747 A1 * | 10/2018 | Ma | F25B 21/02 |
| 2018/0363960 A1 | 12/2018 | Kniffler et al. | |

FOREIGN PATENT DOCUMENTS

| | | |
|---|---|---|
| CN | 105164476 A | 12/2015 |
| DE | 35 17 220 A1 | 11/1985 |
| DE | 44 318 87 A1 | 3/1995 |
| EP | 2016349 B1 | 1/2009 |
| JP | 51-2660 B | 1/1976 |
| JP | 52-12422 B | 4/1977 |
| JP | 2-4182 A | 1/1990 |
| JP | 2008128535 * | 11/2006 |
| JP | 2008-128535 A | 6/2008 |
| JP | 2009-523655 A | 6/2009 |
| JP | 2016-500806 A | 1/2016 |
| JP | 2019-507310 A | 3/2019 |
| KR | 100937202 B1 | 1/2010 |
| WO | 2013165843 A1 | 11/2013 |
| WO | 2014/072239 A1 | 5/2014 |
| WO | 2014/179032 A1 | 11/2014 |

OTHER PUBLICATIONS

English language translation of Japanese office action.
Chinese Office Action dated May 7, 2020, issued in application No. 201780027048.3.
English language translation of Chinese Office Action dated May 7, 2020, issued in application No. 201780027048.3.
International Search Report and Written Opinion for PCT/EP2017/054629 dated May 12, 2017.

* cited by examiner

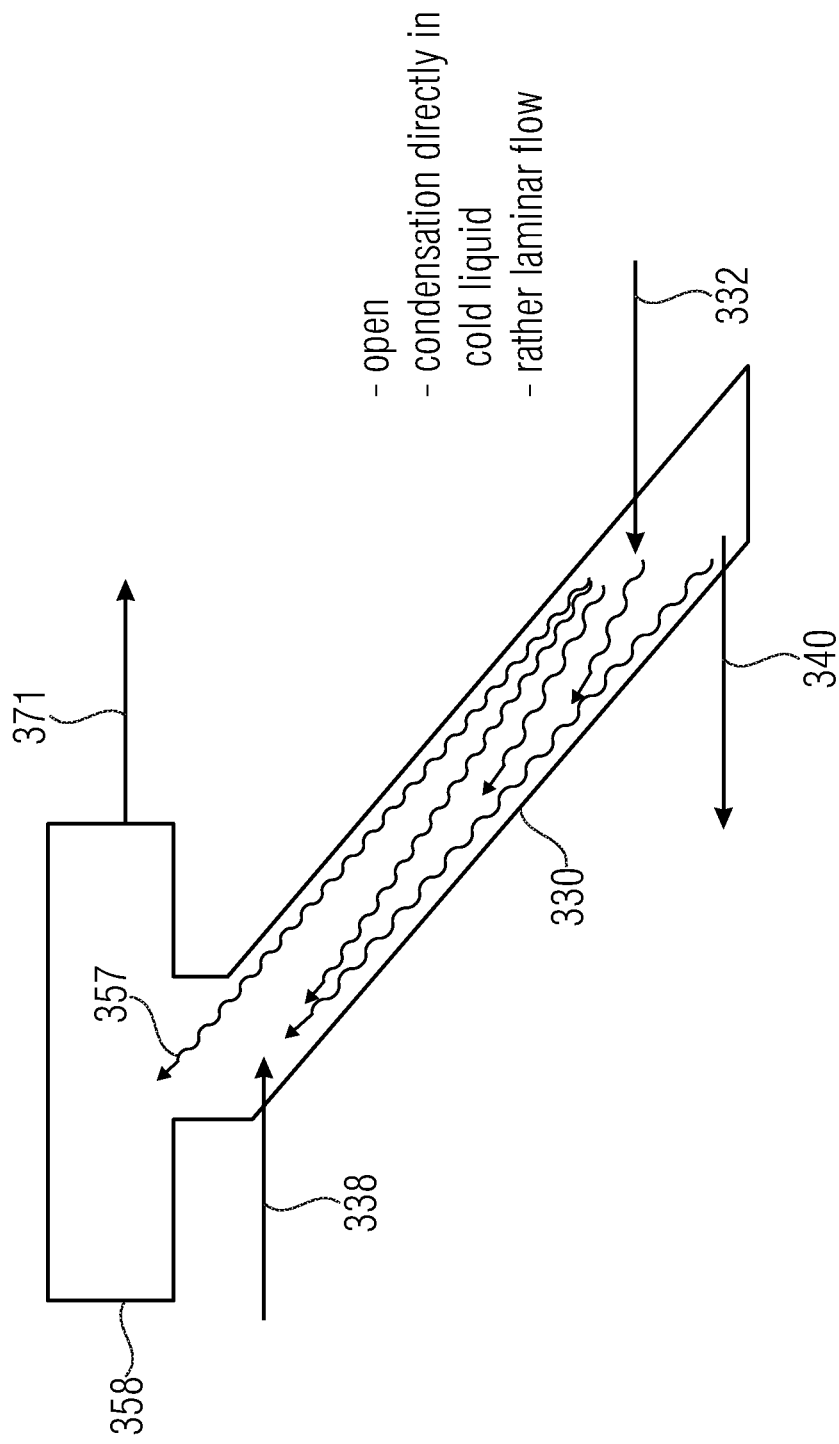

schematic bottom view of the cap

| P[hPa] | 8 | 12 | 30 | 60 | 100 | 1000 |
|---|---|---|---|---|---|---|
| evap. temp. | 4°C | 12°C | 24°C | 36°C | 45°C | 100°C |

HEAT PUMP WITH A GAS TRAP, METHOD FOR OPERATING WITH A GAS TRAP, AND METHOD FOR PRODUCING A HEAT PUMP WITH A GAS TRAP

CROSS-REFERENCES TO RELATED APPLICATIONS

This application is a continuation of copending International Application No. PCT/EP2017/054629, filed Feb. 28, 2017, which is incorporated herein by reference in its entirety, and additionally claims priority from German Application No. DE 102016203410.3, filed Mar. 2, 2016, which is incorporated herein by reference in its entirety.

The present invention relates to heat pumps for heating, cooling or for any other application of a heat pump.

BACKGROUND OF THE INVENTION

FIG. 8A and FIG. 8B provide a heat pump as is described in European Patent EP 2016349 B1. The heat pump initially includes an evaporator 10 for evaporating water as a working liquid so as to generate vapor within a working vapor line 12 on the output side. The evaporator includes an evaporation space (evaporation chamber) (not shown in FIG. 8A) and is configured to generate an evaporation pressure smaller than 20 hPa within said evaporation space, so that at temperatures below 15° C. within the evaporation space, the water will evaporate. The water is, e.g., ground water, brine, i.e. water having a certain salt content, which freely circulates in the earth or within collector pipes, river water, lake water or sea water. Any types of water, i.e. limy water, lime-free water, salty water or salt-free water, may be used. This is due to the fact that any types of water, i.e. all of said "water materials" have the favorable water property that water, which is also known as "R 718", has an enthalpy difference ratio of 6 that can be used for the heat pump process, which corresponds to more than double the typical enthalpy difference ratio of, e.g., R134a.

Through the suction line 12, the water vapor is fed to a compressor/condenser system 14 comprising a fluid flow machine (turbo-machine) such as a radial compressor, for example in the form of a turbocompressor, which is designated by 16 in FIG. 8A. The fluid flow machine is configured to compress the working vapor to a vapor pressure at least larger than 25 hPa. 25 hPa corresponds to a condensation temperature of about 22° C., which may already be a sufficient heating flow temperature of an underfloor heating system. In order to generate higher flow temperatures, pressures larger than 30 hPa may be generated by means of the fluid flow machine 16, a pressure of 30 hPa having a condensation temperature of 24° C., a pressure of 60 hPa having a condensation temperature of 36° C., and a pressure of 100 hPa having a condensation temperature of 45° C. Underfloor heating systems are designed to be able to provide sufficient heating with a flow temperature of 45° C. even on very cold days.

The fluid flow machine is coupled to a condenser 18 configured to condense the compressed working vapor. By means of the condensing process, the energy contained within the working vapor is fed to the condenser 18 so as to then be fed to a heating system via the advance 20a. Via the backflow 20b, the working liquid flows back into the condenser.

In accordance with the invention, it is advantageous to directly withdraw the heat (energy), which is absorbed by the heating circuit water, from the high-energy water vapor by means of the colder heating circuit water, so that said heating circuit water heats up. In the process, a sufficient amount of energy is withdrawn from the vapor so that said stream is condensed and also is part of the heating circuit.

Thus, introduction of material into the condenser and/or the heating system takes place which is regulated by a drain 22 such that the condenser in its condenser space has a water level which remains below a maximum level despite the continuous supply of water vapor and, thus, of condensate.

As was already explained, it is advantageous to use an open circuit, i.e. to evaporate the water, which represents the heat source, directly without using a heat exchanger. However, alternatively, the water to be evaporated might also be initially heated up by an external heat source via a heat exchanger. In addition, in order to also avoid losses for the second heat exchanger, which has expediently been present on the condenser side, the medium can also used directly, and for example when one thinks of a house comprising an underfloor heating system, the water coming from the evaporator can be allowed to directly circulate within the underfloor heating system.

Alternatively, however, a heat exchanger supplied by the advance 20a and exhibiting the backflow 20b may also be arranged on the condenser side, said heat exchanger cooling the water present within the condenser and thus heating up a separate underfloor heating liquid, which typically will be water.

Due to the fact that water is used as the working medium and due to the fact that only that portion of the ground water that has been evaporated is fed into the fluid flow machine, the degree of purity of the water does not make any difference. Just like the condenser and the underfloor heating system, which is possibly directly coupled, the fluid flow machine is supplied with distilled water, so that the system has reduced maintenance requirements as compared to today's systems. In other words, the system is self-cleaning since the system only ever has distilled water supplied to it and since the water within the drain 22 is thus not contaminated.

In addition, it shall be noted that fluid flow machines exhibit the property that they—similar to the turbine of a plane—do not bring the compressed medium into contact with problematic substances such as oil, for example. Instead, the water vapor is merely compressed by the turbine and/or the turbocompressor, but is not brought into contact with oil or any other medium impairing purity, and is thus not soiled.

The distilled water discharged through the drain thus can readily be re-fed to the ground water—if this does not conflict with any other regulations. Alternatively, it can also be made to seep away, e.g. in the garden or in an open space, or it can be fed to a sewage plant via the sewer system if this is stipulated by regulations.

Due to the combination of water as the working medium with the enthalpy difference ratio, the usability of which is double that of R134a, and due to the thus reduced requirements placed upon the closed nature of the system and due to the utilization of the fluid flow machine, by means of which the compression factors that may be used are efficiently achieved without any impairments in terms of purity, an efficient and environmentally neutral heat pump process is provided.

FIG. 8B shows a table for illustrating various pressures and the evaporation temperatures associated with said pressures, which results in that relatively low pressures are to be selected within the evaporator in particular for water as the working medium.

DE 4431887 A1 discloses a heat pump system comprising a light-weight, large-volume high-performance centrifugal compressor. Vapor which leaves a compressor of a second stage exhibits a saturation temperature which exceeds the ambient temperature or the temperature of a coding water that is available, whereby heat dissipation is enabled. The compressed vapor is transferred from the compressor of the second stage into the condenser unit, which consists of a granular bed provided inside a cooling-water spraying means on an upper side supplied by a water circulation pump. The compressed water vapor rises within the condenser through the granular bed, where it enters into a direct counter flow contact with the cooling water flowing downward. The vapor condenses, and the latent heat of the condensation that is absorbed by the cooling water is discharged to the atmosphere via the condensate and the cooling water, which are removed from the system together. The condenser is continually flushed, via a conduit, with non-condensable gases by means of a vacuum pump.

WO 2014072239 A1 discloses a condenser having a condensation zone for condensing vapor, that is to be condensed, within a working liquid. The condensation zone is configured as a volume zone and has a lateral boundary between the upper end of the condensation zone and the lower end. Moreover, the condenser includes a vapor introduction zone extending along the lateral end of the condensation zone and being configured to laterally supply vapor that is to be condensed into the condensation zone via the lateral boundary. Thus, actual condensation is made into volume condensation without increasing the volume of the condenser since the vapor to be condensed is introduced not only head-on from one side into a condensation volume and/or into the condensation zone, but is introduced laterally and, advantageously, from all sides. This not only ensures that the condensation volume made available is increased, given identical external dimensions, as compared to direct counterflow condensation, but that the efficiency of the condenser is also improved at the same time since the vapor to be condensed that is present within the condensation zone has a flow direction that is transverse to the flow direction of the condensation liquid.

Particularly when heat pumps are operated at relatively low pressures, i.e. pressures smaller than or clearly smaller than the atmospheric pressure, there is a need to evacuate the heat pump so that within the evaporator, a pressure is created which is low enough for the working medium used, which may be water, for example, to start to evaporate at the prevailing temperature.

However, at the same time this means that said low pressure is maintained also during operation of the heat pump. On the other hand, it is potentially possible, in particular with designs involving reasonable cost, for leaks to exist within the heat pump. At the same time, foreign gases which will no longer condense within the condenser and will thus result in a pressure rise in the heat pump may remove themselves from the liquid or gaseous medium. It has turned out that an increasing proportion of foreign gas within the heat pump results in increasingly low efficiency.

Despite the fact that foreign gases exist one may generally assume that it is mainly the desired working vapor that is present within the gas space. Therefore, there is a mixture of working vapor and foreign gases which contains predominantly working vapor and contains foreign gases only in a relatively small proportion.

If one were to evacuate continuously, the result would be in that foreign gases are indeed removed. However, at the same time, working vapor is also continuously extracted from the heat pump. In particular when evacuation were to take place on the condenser side, said extracted working vapor will already have been heated. However, extraction of compressed and/or heated working vapor is disadvantageous in two respects. For one thing, unused energy is removed from the system and typically released into the environment. For another thing, continuous heating of working vapor results in that the level of working liquid decreases, in particular within closed systems. Thus, working liquid will be filled up. Moreover, the vacuum pump involves using a substantial amount of energy, which is problematic in particular in that energy is expended on extracting working vapor that is actually desired within the heat pump since the concentration of foreign gas within the heat pump is relatively low but results in efficiency losses at low concentrations already.

SUMMARY

According to an embodiment, a heat pump may have: a condenser for condensing compressed working vapor; a gas trap coupled to the condenser via a foreign gas feed inlet and including:
    a housing having a foreign gas feed entrance;
    a working liquid feed inlet within the housing; and
    a working liquid discharge outlet within the housing; and
a pump for pumping off gas from the housing, wherein the housing, the working liquid feed inlet and the working liquid discharge outlet are configured such that during operation, a working liquid flow takes place, within the housing, from the working liquid feed inlet to the working liquid discharge outlet, wherein the working liquid feed inlet is coupled to the heat pump so as to direct, during operation of the heat pump, working liquid which is colder than a working vapor to be condensed within the condenser, wherein the housing is arranged perpendicularly or obliquely in the direction of operation, the working liquid feed inlet being arranged above the working liquid discharge outlet, and wherein the foreign gas feed device is arranged below the working liquid feed inlet and above the working liquid discharge outlet.

According to another embodiment, a method of operating a heat pump having a condenser for condensing compressed working vapor; a gas trap coupled to the condenser via a foreign gas feed inlet and including: a housing including a foreign gas feed entrance; a working liquid feed inlet within the housing; and a working liquid discharge outlet within the housing; and a pump for pumping off gas from the housing, may have the steps of: generating a working liquid flow from the working liquid feed inlet to the working liquid discharge outlet within the housing, and directing working liquid into the housing, which is colder than a working vapor to be condensed within the condenser, wherein the housing is arranged perpendicularly or obliquely in the direction of operation, the working liquid feed inlet being arranged above the working liquid discharge outlet, and wherein the foreign gas feed device is arranged below the working liquid feed inlet and above the working liquid discharge outlet.

According to another embodiment, a method of producing a heat pump including: a condenser for condensing compressed working vapor; a gas trap coupled to the condenser via a foreign gas feed inlet and including: a housing including a foreign gas feed entrance; a working liquid feed inlet within the housing; and a working liquid discharge outlet within the housing; and a pump for pumping off gas from the housing, may have the steps of: configuring the housing, the working liquid feed inlet and the working liquid discharge outlet such that during operation, a working liquid flow takes place, within the housing, from the working liquid feed inlet to the working liquid discharge outlet, and coupling the working liquid feed inlet to the heat pump such that during operation of the heat pump, working liquid is directed through the housing which is colder than a working vapor to be condensed within the condenser, wherein the housing is arranged perpendicularly or obliquely in the direction of operation, wherein the working liquid feed inlet is arranged above the working liquid discharge outlet, and wherein the foreign gas feed device is arranged below the working liquid feed inlet and above the working liquid discharge outlet.

The heat pump in accordance with the present invention includes a condenser for condensing compressed and/or possibly heated working vapor, and a gas trap coupled to the condenser by a foreign gas feed inlet. In particular, the gas trap comprises a housing having a foreign gas feed entrance, a working liquid feed inlet within the housing, a working liquid discharge outlet within the housing and a pump for pumping the gas out from the housing. The housing, the working liquid feed inlet and the working liquid discharge outlet are configured and arranged such that during operation, the working liquid flows from the working liquid feed inlet to the working liquid discharge outlet within the housing. In addition, the working liquid feed inlet is coupled to the heat pump such that during operation, the heat pump has working liquid fed to it which is colder than working vapor that is present within the condenser and is to be condensed.

Depending on the implementation, the working liquid feed inlet is coupled to the heat pump so as to direct, during operation of the heat pump, working liquid that is colder than a temperature associated with a saturated-vapor pressure of a working vapor to be condensed within the condenser. Consequently, the saturated-vapor pressure of the working vapor involves a temperature as may be read, e.g., from the h-logp diagram or a similar diagram.

Thus, foreign gas and working vapor, both of which enter into the condenser through the foreign gas feed inlet such that they are mixed in a specific ratio, are brought into direct or indirect contact with the working liquid flow, so that foreign gas accumulation results. Said foreign gas accumulation comes about due to the fact that the working vapor condenses as a result of direct or indirect contact with the working liquid flow, which is relatively cold. On the other hand, the foreign gases cannot condense, so that foreign gas will increasingly accumulate within the housing of the gas trap. Thus, the housing represents a gas trap for the foreign gas, while the working vapor can condense and remains within the system.

The accumulated foreign gas is removed by the pump for pumping gas out of the housing. Unlike the ratio between foreign gas and working vapor that is present within the condenser, where the concentration of the foreign gas is still very low, pumping off of gas from the housing of the gas trap does not result in a particularly pronounced extraction of working vapor from the system since the major part of the working vapor contained within the working liquid flow is condensed either by direct or indirect contact and therefore can no longer be pumped off by the pump.

This results in several advantages. One advantage consists in that working vapor gives off its energy, and that said energy thus remains within the system and is not lost to the surroundings. A further advantage consists in that the amount of extracted working liquid is heavily reduced. Thus, refilling of working liquid is hardly or not at all necessary anymore, which reduces the expenditure involved in correct maintenance of the working liquid level while also reducing the expenditure involved in possibly nevertheless having to collect and take away any extracted working liquid. A further advantage consists in that the pump for pumping off gas from the housing needs to pump off less since relatively concentrated foreign gas is discharged. The energy consumption of the pump is therefore low, and the pump need not be designed to be so powerful. A pump designed to be less powerful indeed results in that a slightly longer time period is involved in first-time evacuation of the system. However, said time period is not critical in a normal application since it is typically only service technicians who will perform a first evacuation during the start-up procedure or following servicing. If a faster procedure is desired, such service technicians may possibly connect an external pump they have brought along, which need not be fixedly coupled to the system, however.

In terms of a further aspect of the present invention, a foreign gas collection space is provided inside the condenser already. A heat pump in accordance with said further aspect includes a condenser for condensing compressed and/or heated working vapor, a foreign gas collection space mounted inside the condenser, said foreign gas collection space comprising a condensation surface, which during operation of the heat pump is colder than a temperature of the working vapor to be condensed, and a partition wall arranged, within the condenser, between the condensation surface and a condensation zone. In addition, a foreign gas discharge device is provided which is coupled to the foreign gas collection space so as to discharge foreign gas from the foreign gas collection space.

Depending on the implementation, the condensation surface is colder than a temperature associated with a saturated-vapor pressure of a working vapor to be condensed within the condenser. As was explained above, saturated-vapor pressure of the working vapor will have associated therewith a temperature which can be gathered, e.g., from the h-logp diagram or a similar diagram.

In one implementation, the foreign gas which has now accumulated within the condenser may be discharged directly toward the outside. Alternatively, however, the foreign gas discharge device may be coupled to the gas trap in accordance with the first aspect of the present invention, so that a gas which has foreign gas accumulated therein is already fed into the gas trap so as to further increase the efficiency of the entire device. However, direct discharge of foreign gas, which has already accumulated, from the foreign gas collection space within the condenser already results in increased efficiency as compared to a procedure where gas that is simply present within the condenser would be pumped off. In particular, the condensation surface within the foreign gas collection space ensures that working vapor condenses on the condensation surface and that, as a result, foreign gas accumulates. So that said accumulation of foreign gas can take place in a condenser which is quite turbulent, the partition wall is provided which is arranged, within the condenser, between the (cold) condensation surface and the condensation zone. Thus, the condensation zone is separated off from the foreign gas collection space, so that a zone is provided which is steadied, as it were, and is less turbulent than the condensation zone. In said steadied zone, any working vapor that is still present may condense on the relatively cold condensation surface, and the foreign gas accumulates, within the foreign gas collection space, between the condensation surface and the partition wall. Therefore, the transition wall operates in two respects. For one thing, it creates a steadied zone, and for another thing, it acts as an insulation to the effect that no undesired heat losses take place on the cold surface, i.e. on the condensation surface.

The foreign gas which has accumulated will then be discharged through the foreign gas discharge device coupled to the foreign gas collection space; specifically, depending on the implementation, it will be directly discharged toward the outside or into the gas trap in accordance with the first aspect of the present invention.

The aspects of the gas trap, on the one hand, and of the foreign gas collection space within the condenser, on the other hand, may also be combined. However, both aspects may also be employed separately so as to achieve substantial improvement in efficiency already on the basis of the above-described advantages.

BRIEF DESCRIPTION OF THE DRAWINGS

Embodiments of the present invention will be detailed subsequently referring to the appended drawings, in which:

FIG. 2B shows an alternative implementation of the gas trap involving direct contact and an oblique arrangement;

DETAILED DESCRIPTION OF THE INVENTION

Figure 1A:
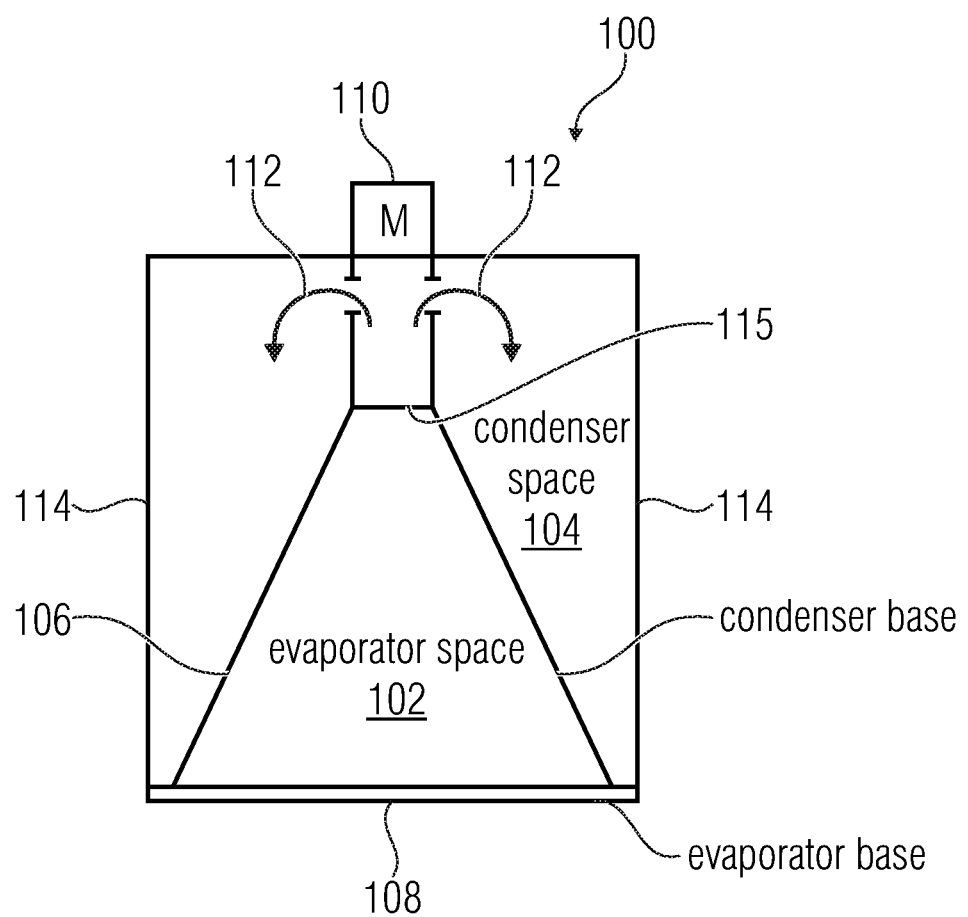
FIG. 1A shows a schematic view of a heat pump having an interleaved evaporator/condenser arrangement.

FIG. 1A shows a heat pump 100 comprising, an evaporator for evaporating working liquid within an evaporator space 102. The heat pump further includes a condenser for condensing evaporated working liquid within a condenser space 104 bounded by a condenser base 106. As shown in FIG. 1A, which can be regarded both as a sectional representation and as a side view, the evaporator space 102 is at least partially surrounded by the condenser space 104. Moreover, the evaporator space 102 is separated from the condenser space 104 by the condenser base 106. In addition, the condenser base is connected to an evaporator base 108 so as to define the evaporator space 102. In one implementation, a compressor 110 is provided above the evaporator space 102 or at a different location, said compressor 110 not being explained in detail in FIG. 1A but being configured, in principle, to compress evaporated working liquid and to direct same into the condenser space 104 as compressed vapor 112. Moreover, the condenser space is bounded toward the outside by a condenser wall 114. The condenser wall 114 is also attached to the evaporator base 108, as is the condenser base 106. In particular, the dimensioning of the condenser base 106 in the area forming the interface with the evaporator base 108 is such that in the embodiment shown in FIG. 1A, the condenser base is fully surrounded by the condenser space wall 114. This means that the condenser space extends right up to the evaporator base, as shown in FIG. 1A, and that the evaporator base simultaneously extends very far upward, typically almost through the entire condenser space 104.

This "interleaved" or intermeshing arrangement of the condenser and the evaporator, which arrangement is characterized in that the condenser base is connected to the evaporator base, provides a particularly high level of heat pump efficiency and therefore enables a particularly compact design of a heat pump. In terms of order of magnitude, dimensioning of the heat pump, e.g., in a cylindrical shape, is such that the condenser wall 114 represents a cylinder having a diameter of between 30 and 90 cm and a height of between 40 and 100 cm. However, the dimensioning can be selected as a function of the useful power class of the heat pump, but will advantageously range within the dimensions mentioned. Thus, a very compact design is achieved which additionally is easy to produce at low cost since the number of interfaces, in particular for the evaporator space subjected to almost a vacuum, can be readily reduced when the evaporator base in accordance with advantageous embodiments of the present invention is configured such that it includes all of the liquid feed inlets/discharge outlets and such that, as a result, no liquid feed inlets/discharge outlets from the side or from the top are required.

In addition, it shall be noted that the operating direction of the heat pump is as shown in FIG. 1A. This means that during operation, the evaporator base defines the lower portion of the heat pump, however, apart from lines connecting it to other heat pumps or to corresponding pump units. This means that during operation, the vapor produced within the evaporator space rises upward and is redirected by the motor and is fed into the condenser space from top to bottom, and that the condenser liquid is directed from bottom to top and is then supplied to the condenser space from the top and then flows from top to bottom within the condenser space such as by means of individual droplets or by means of small liquid streams so as to react with the compressed vapor, which advantageously is supplied in a transverse direction, for the purposes of condensation.

This arrangement, which is mutually "interleaved" in that the evaporator is almost entirely or even entirely arranged within the condenser, enables very efficient implementation of the heat pump with optimum space utilization. Since the condenser space extends right up to the evaporator base, the condenser space is configured within the entire "height" of the heat pump or at least within a major portion of the heat pump. At the same time, however, the evaporator space is as large as possible since it also extends almost over the entire height of the heat pump. Due to the mutually interleaved arrangement in contrast to an arrangement where the evaporator is arranged below the condenser, the space is exploited in an optimum manner. This enables particularly efficient operation of the heat pump, on the one hand, and a particularly space-saving and compact design, on the other hand, since both the evaporator and the condenser extend over the entire height. Thus, admittedly, the levels of "thickness" of the evaporator space and of the condenser space decrease. However, one has found that the reduction of the "thickness" of the evaporator space, which tapers within the condenser, is unproblematic since the major part of the evaporation takes place in the lower region, where the evaporator space fills up almost the entire volume available. On the other hand, the reduction of the thickness of the condenser space is uncritical particularly in the lower region, i.e., where the evaporator space fills up almost the entire region available since the major part of the condensation takes place at the top, i.e., where the evaporator space is already relatively thin and thus leaves sufficient space for the condenser space. The mutually interleaved arrangement is thus ideal in that each functional space is provided with the large volume where said functional space involves said large volume. The evaporator space has the large volume at the bottom, whereas the condenser space has the large volume at the top. Nevertheless, that corresponding small volume which for the respective functional space remains where the other functional space has the large volume contributes to an increase in efficiency as compared to a heat pump where the two functional elements are arranged one above the other, as is the case, e.g., in WO 2014072239 A1.

In advantageous embodiments, the compressor is arranged on the upper side of the condenser space such that the compressed vapor is redirected by the compressor, on the one hand, and is simultaneously fed into a marginal gap of the condenser space. Thus, condensation with a particularly high level of efficiency is achieved since a cross-flow direction of the vapor in relation to a condensation liquid flowing downward is achieved. This condensation comprising cross-flow is effective particularly in the upper region, where the evaporator space is large, and does not require a particularly large region in the lower region where the condenser space is small to the benefit of the evaporator space, in order to nevertheless allow condensation of vapor particles that have reached said region.

An evaporator base connected to the condenser base is advantageously configured such that it accommodates within it the condenser intake and drain, and the evaporator intake and drain, it being possible, additionally, for certain passages for sensors to be present within the evaporator and/or within the condenser. In this manner, one achieves that no passages of conduits through the evaporator are required for the capacitor intake and drain, which is almost under a vacuum. As a result, the entire heat pump becomes less prone to defects since each passage through the evaporator would present a possibility of a leak. To this end, the condenser base is provided with a respective recess in those positions where the condenser intakes and drains are located, to the effect that no condenser feed inlets/discharge outlets extend within the evaporator space defined by the condenser base.

The condenser space is bounded by a condenser wall, which can also be mounted on the evaporator base. Thus, the evaporator base has an interface both for the condenser wall and for the condenser base and additionally has all of the liquid feed inlets both for the evaporator and for the condenser.

In specific implementations, the evaporator base is configured to comprise connection pipes for the individual feed inlets, which have cross-sections differing from a cross-section of the opening on the other side of the evaporator base. The shape of the individual connection pipes is then configured such that the shape, or cross-sectional shape, changes across the length of the connection pipe, but the pipe diameter, which plays a part in the flow rate, is almost identical with a tolerance of ±10%. In this manner, water flowing through the connection pipe is prevented from starting to cavitate. Thus, on account of the good flow conditions obtained by the shaping of the connection pipes, it is ensured that the corresponding pipes/lines can be made to be as short as possible, which in turn contributes to a compact design of the entire heat pump.

In a specific implementation of the evaporator base, the condenser intake is split up into a two-part or multi-part stream, almost in the shape of "eyeglasses". Thus, it is possible to feed in the condenser liquid in the condenser at its upper portion at two or more locations at the same time. Thus, a strong and, at the same time, particularly even condenser flow from top to bottom is achieved which enables achieving highly efficient condensation of the vapor which is introduced into the condenser from the top as well.

A further feed inlet, having smaller dimensions, within the evaporator base for condenser water may also be provided in order to connect a hose therewith which feeds cooling liquid to the compressor motor of the heat pump; what is used to achieve cooling is not the cold liquid which is supplied to the evaporator but the warmer liquid which is supplied to the condenser but which in typical operational situations is still cool enough for cooling the motor of the heat pump.

The evaporator base is characterized in that it exhibits combined functionality. On the one hand, it is ensures that no condenser feed inlets need to be passed through the evaporator, which is under very low pressure. On the other hand, it represents an interface toward the outside, which advantageously has a circular shape since in the case of a circular shape, a maximum amount of evaporator surface area remains. All of the feed inlets/discharge outlets lead through the one evaporator base and from there extend either into the evaporator space or into the condenser space. It is particularly advantageous to manufacture the evaporator base from plastics injection molding since the advantageous, relatively complicated shapes of the intake/drain pipes can be readily implemented in plastics injection molding at low cost. On the other hand, it is readily possible, due to the implementation of the evaporator base as an easily accessible workpiece, to manufacture the evaporator base with sufficient structural stability so that it can readily withstand in particular the low evaporator pressure.

In the present application, identical reference numerals relate to elements which are identical or identical in function; however, not all of the reference numerals will be repeated in all of the drawings if they come up more than once.

Figure 1B:
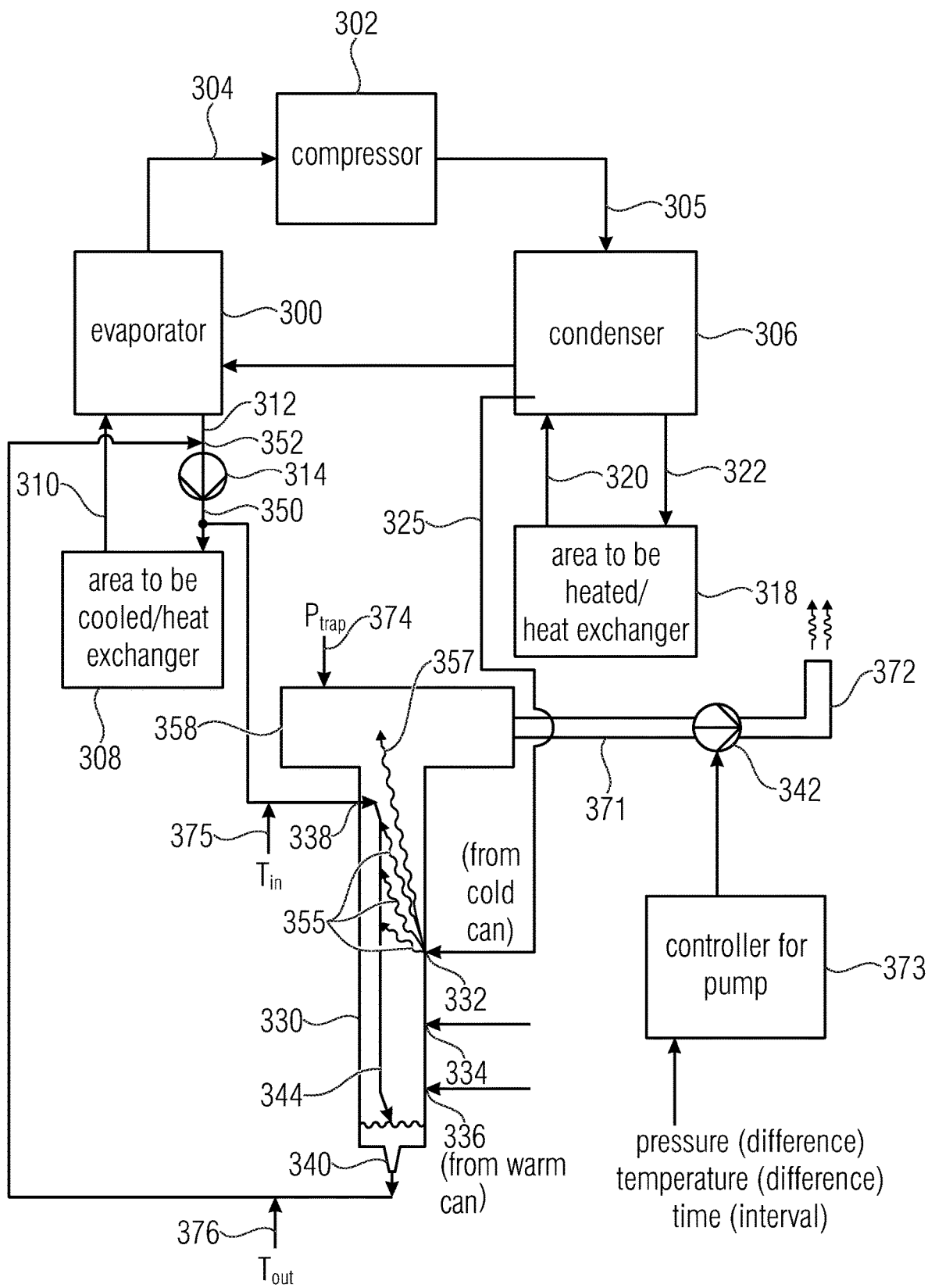
FIG. 1B shows a heat pump comprising a gas trap in accordance with an embodiment of the present invention in relation to the first aspect.

FIG. 1B shows a heat pump comprising a gas trap in accordance with the first aspect of the present invention in an advantageous embodiment, which may generally have an interleaved arrangement of evaporator and condenser, or may have any other arrangement regarding the evaporator and the condenser.

In particular, the heat pump generally includes an evaporator 300 coupled to a compressor 302 so as to suck in, compress and, thus, heat up cold working vapor via a vapor pipe 304. The heated-up and compressed working vapor is discharged to a condenser 306. The evaporator 300 is coupled to a region to be cooled 308, specifically via an evaporator intake line 310 and an evaporator drain line 312, which typically has a pump 314 provided therein. In addition, a region to be heated 318 is provided which is coupled to the condenser 306, specifically via a condenser intake line 320 and a condenser drain line 322. The condenser 306 is configured to condense heated-up working vapor within the condenser intake channel 305.

In addition, provision is made of a gas trap which is coupled to the condenser 306 via a foreign gas feed inlet 325. The gas trap includes, in particular, a housing 330 comprising a foreign gas feed entrance 332 and possibly further foreign gas feed entrances 334, 336. Moreover, the housing 330 includes a working liquid feed inlet 338 as well as a working liquid discharge outlet 340. The heat pump further includes a pump 342 for pumping off gas from the housing 330. In particular, the working liquid feed inlet 338, the working liquid discharge outlet 340 and the housing are configured and arranged such that during operation, a flow of working liquid 344 takes place from the working liquid feed inlet 338 to the working liquid discharge outlet 340 within the housing 330.

In addition, the working liquid feed inlet 338 is coupled to the heat pump such that during operation, the heat pump has working liquid fed to it which is colder than working vapor within the condenser that is to be condensed and which is advantageously even colder than the working liquid which enters into the condenser or exits from the condenser. For this purpose, working liquid is advantageously taken from the evaporator drain line at a branch-off point 350 since said working liquid is the coldest working liquid within the system. The branch-off point 350 is located (in the direction of flux) downstream from the pump 314, so that the gas trap requires no pump of its own. In addition, it is advantageous to couple the backflow from the gas trap, i.e. the working liquid discharge outlet 340, to a branching point 352 of the drain line that is arranged upstream from the pump 314.

Depending on the implementation, the flow of working liquid through the gas trap, i.e. the stream of working liquid, represents a volume that is smaller than 1% of the main flow accomplished by the pump 314, and advantageously even lies within the order of magnitude of 0.5 to 2‰ of the main flow, which flows from the evaporator into the region to be cooled 308, or into a heat exchanger to which the region to be cooled may be connected, via the evaporator outlet 312.

Even though FIG. 1B shows that the working liquid flow originates from a liquid contained within the heat pump system, this is not the case in all of the embodiments. Alternatively or additionally, the flow may also be provided by an external cycle, i.e. an external cooling liquid. Said coding liquid may flow and be discharged through the gas trap, which in the case of water is no problem anyway. However, if a cycle is employed, it is at the exit of the gas trap that the liquid will flow into a cooling area, where the liquid is cooled. Here, cooling by, e.g., a Peltier element may be employed, so that the liquid entering into the gas trap will be colder than the liquid exiting from the gas trap.

As is shown in FIG. 1B, a mixture of working vapor and foreign gases passes from the condenser 306 into the housing 330 of the gas trap via the foreign gas feed inlet 325. Within the housing 330 of the gas trap, condensation of the working vapor within the gas mixture takes place within the cold working liquid, as indicated at 355. However, foreign gas cannot be removed by means of condensation at the same time but will accumulate within the gas trap, as indicated at 357. In order to provide room for the accumulated foreign gas, the housing includes an accumulation space 358, which is arranged at the top, for example.

Due to the pressure differences between the pressure prevailing within the condenser 306 and the pressure prevailing within the gas trap, which gas trap has, due to the low temperature of the working liquid, a pressure of the order of magnitude of that of the evaporator, a flow automatically occurs from the condenser 306 into the housing 330 of the gas trap through the foreign gas feed inlet 325. The water vapor which is contained within the mixture of foreign gas and water vapor and which enters into the housing at the foreign gas feed inlet 332, 334, 336 tends to flow toward the coldest place. The coldest place is where the working liquid enters into the housing, i.e. at the working liquid entrance, or working liquid feed inlet, 338. Thus, water vapor flows from the bottom up within the housing 330. Said flow of water vapor carries along the foreign gas atoms which will then, as indicated at 357, accumulate within the gas trap at the top because they cannot condense along with the working liquid. Therefore, the gas trap results in that an automatic, as it were, flow from the condenser into the housing takes place without requiring a pump for this purpose, and in that the foreign gas will then flow from the bottom up within the gas trap and will accumulate in the upper area of the housing 330 and will be able to be pumped off from there by the pump 342.

As shown in FIG. 1B, it is advantageous to couple the working liquid feed inlet 338 to a pump exit of the pump 314, i.e. at the branching point 350. Depending on the implementation, however, any other, relatively cool, liquid may be used, namely, for example, at the backflow of the evaporator, i.e. within the line 310, wherein the temperature level is still lower than that within the condenser backflow 320, for example. However, the coldest liquid within the system will result in the highest level of efficiency for the gas trap. The arrangement of the working liquid intake 338, which is coupled to the branching point 350 downstream from the pump 314, results in that the feeding of working liquid into the gas trap requires no pump of its own. However, if a pump is provided which solely or as an additional functionality "serves" the gas trap, the working liquid feed inlet 338 may also be coupled to a different point within the system in order to direct a specific flow of working liquid into the gas trap. For example, the working liquid might also be branched off even downstream from a heat exchanger as is depicted, e.g., with reference to FIG. 4, i.e. it might be branched off on the "customer's side", as it were. However, given that the system should be exposed to as little influence on the part of customers as possible, said approach is not advantageous but is possible, in principle.

As shown in FIG. 13, the pump 342 is configured to pump off gas from the housing 330. For this purpose, the pump 342 is coupled to the accumulation space 358 via an exhaust line 371. On the exit side, the pump has an ejection line 372 configured to output the exhausted mixture of accumulated foreign gas and the remaining water vapor. Depending on the implementation, the line 372 may simply be open toward the surroundings or may lead into a receptacle where the remaining water vapor may condense so as to be eventually disposed of or be re-introduced into the system.

The pump 342 is controlled via a controller 373. Controlling of the pump may take place on the grounds of a pressure difference or of an absolute pressure, on the grounds of a temperature difference or an absolute temperature, or on the grounds of an absolute time control or of a time-interval control. Possible control is effected, for example, via a pressure $P_{trap}$ 374 prevailing within the gas trap. Alternative control takes place via the inflow temperature $T_{in}$ 375 at the working liquid feed inlet 338 or via an outflow temperature $T_{out}$ 376. In particular, the outflow temperature $T_{out}$ 376 at the working liquid discharge outlet 340 is a measure of how much water vapor has condensed from the foreign gas feed inlet 325 into the working liquid. At the same time, the pressure prevailing within the gas trap $P_{trap}$ 374 is a measure of how much foreign gas has already accumulated. As the amount of foreign gas accumulated increases, the pressure within the housing 330 increases, and once a specific pressure is exceeded, the controller 373 may be activated, for example, to switch on the pump 342, specifically for such time until the pressure has returned to the desired low range. After that the pump may be switched off again.

An alternative control parameter for the pump is, e.g., the difference between $T_{in}$ 375 and $T_{out}$ 376. For example, if it turns out that the difference between said two values is smaller than a minimum difference, this will mean that hardly any water vapor condenses anymore due to the increased pressure prevailing within the gas trap. Therefore it is useful to switch on the pump 342, specifically for such time until a difference exceeding a specific threshold value is reached. After that, the pump is switched off again.

Therefore, possible quantities to be measured are the pressure, the temperature, e.g. at the point of condensation, a temperature difference between the water feed inlet and the point of condensation, a driving pressure increase for the entire condensation process, etc. As depicted however, the simplest possibility is to perform control via a temperature difference or a time interval, for which no sensors are required at all. This is readily possible in the present embodiment since the gas trap provides very efficient foreign gas accumulation and since, consequently, there are no problems regarding too high an extraction of working vapor from the system when the pump is not operated without interruption.

Figure 2A:
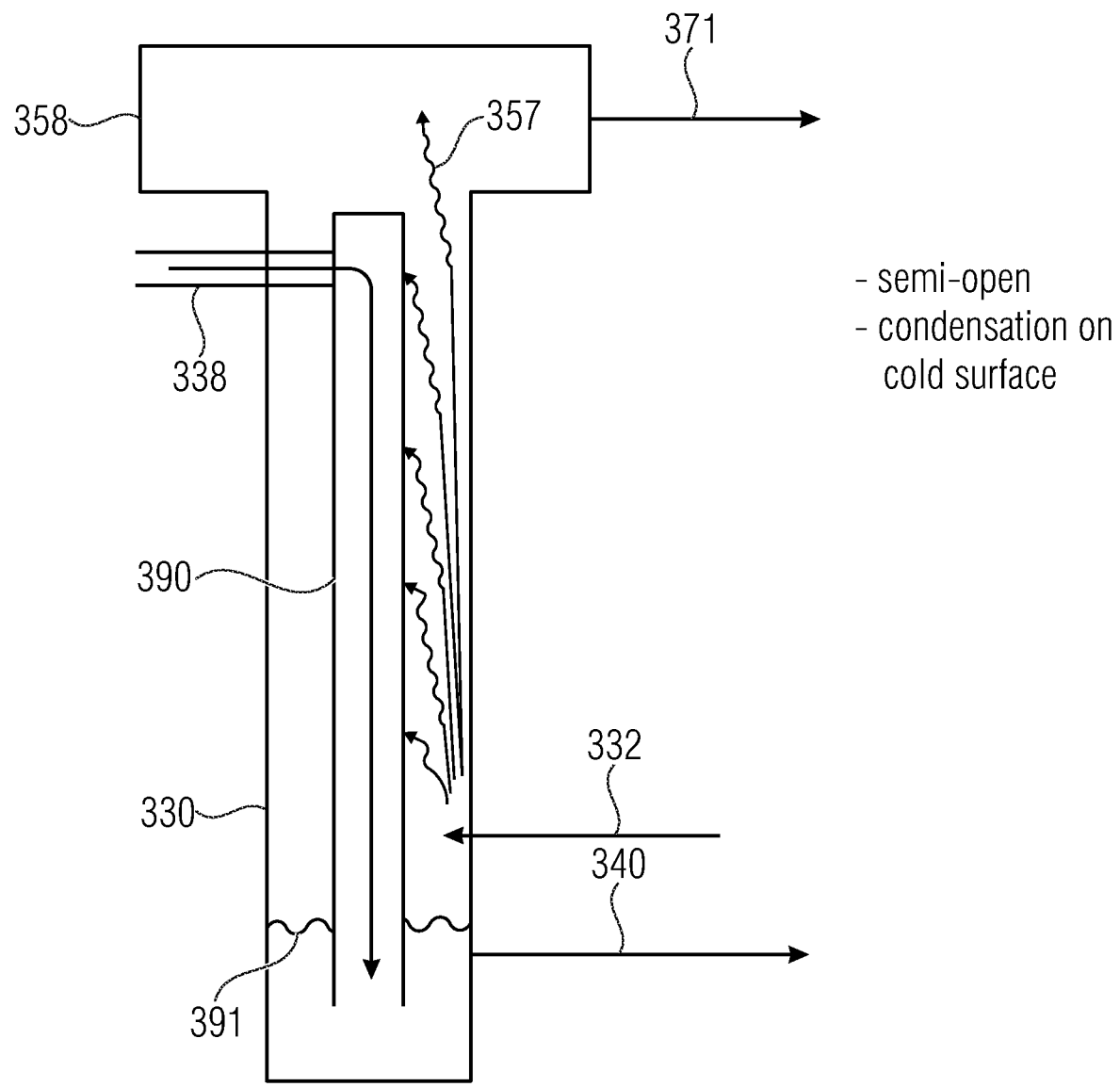
FIG. 2A shows a representation of the housing of the gas trap in accordance with an implementation involving indirect contact.
Figure 3:
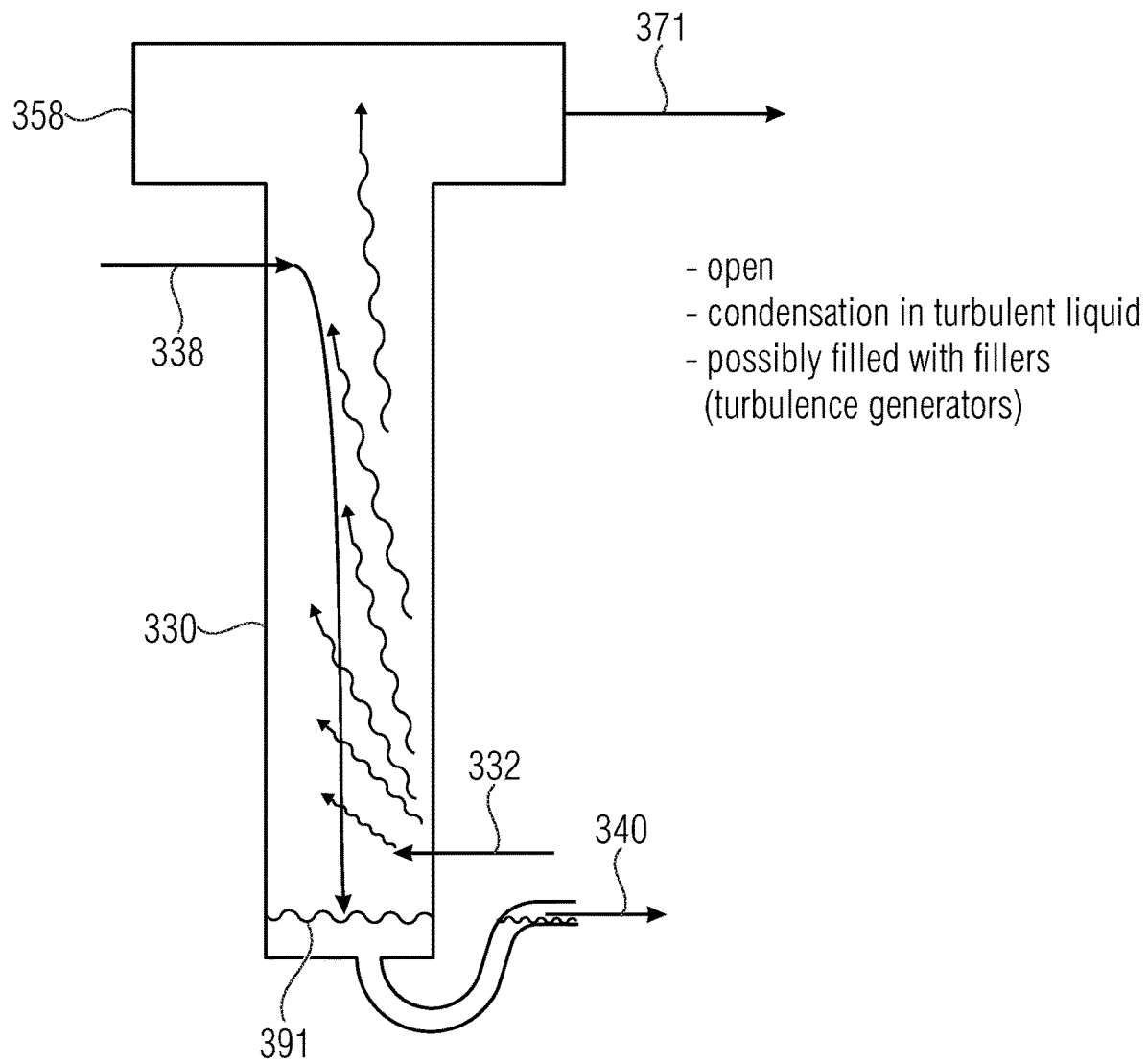
FIG. 3 shows an alternative implementation of the gas trap involving a perpendicular arrangement with maximum turbulence and involving direct contact.

FIG. 2A, FIG. 2B and FIG. 3 show different implementations of the gas trap. FIG. 2A shows a semi-open variant of the gas trap. Here, the gas trap has a pipe 390 advantageously formed of metal arranged therein which is coupled to the working liquid intake 338. The working liquid then flows downward within the pipe and to the working liquid drain 340. The working medium vapor which is introduced into the gas trap by means of the feed inlet 332 now no longer condenses directly within the working liquid but on the (cold) surface of the pipe 390. The end of the pipe is arranged within a level 391 of working liquid into which also the water condensed on the pipe surface flows downward along the pipe.

Therefore, FIG. 2A shows a semi-open gas trap exhibiting condensation on a cold surface, namely the surface of the object 390.

FIG. 2B shows a further variant comprising a rather laminar flow. Here, the gas trap is arranged in an oblique manner, and/or the housing 330 is formed in an oblique manner, so that the water flows downward in a relatively calm, i.e. hardly turbulent and rather laminar, manner from the feed inlet 338 to the discharge outlet 340. The vapor which is supplied through the feed inlet 332 condenses with the laminar flow, whereas foreign gas components 357 accumulate within the foreign gas accumulation space 358. Again, an open system is depicted wherein condensation takes place directly within the cold liquid, which now exhibits a rather laminar flow, however.

FIG. 3 shows a further variant having an open configuration. In particular, a very turbulent flow takes place, namely directly essentially perpendicularly from the top from the intake 338 downward to the drain 340. FIG. 3 further shows that the drain 340 is configured in the form of a syphon, for example, so that it is ensured, at the bottom of the housing, that a liquid level 391 is maintained. In this manner, it is achieved that the working medium vapor which is fed in by the feed inlet 332 cannot flow directly into the evaporator drain, or into the cold flow from which the working medium intake 338 is branched off, since in this case the foreign gas would not be separated but would be re-introduced directly into the system on the evaporator side.

To improve condensation it is useful, in particular in the embodiment shown in FIG. 3, to fill the housing 330 with turbulence generators so that the flow of the working liquid from the intake 338 to the drain 340 is as turbulent as possible.

Therefore, while FIG. 2B, FIG. 3 and also FIG. 1B depict open variants wherein condensation takes place directly within the cold liquid, FIG. 2A shows a variant where condensation takes place on a cold surface of a mediation element 390 such as the pipe described in FIG. 2A, for example, which has a cold surface due to the fact that the cold working liquid flows, inside the mediation element, from the intake 338 to the drain 340. However, depending on the implementation, cooling may also be achieved by means of other variants, i.e. by taking any other measure while using internal liquids/vapors or external cooling measures so as to have an efficient gas trap within the heat pump that is coupled to the condenser 306 via the foreign gas feed line 325.

Advantageously, the housing 330 is configured to be elongated, specifically as a pipe having a diameter of 50 mm or more at the top within the foreign gas accumulation space 328 and having a diameter of 25 mm or more at the bottom, i.e. within the condensation area. In addition, it is advantageous for the condensation area and/or flow area, i.e. the difference between the intake 338 and the drain 340 with regard to the perpendicular height to have a length of at least 20 cm. Moreover, it is advantageous for a flow to take place, i.e. for the gas trap to have at least a perpendicular component, even though it may be arranged in an oblique manner. However, a completely horizontal gas trap is not advantageous but is possible as long as during operation, working liquid flows, within the housing, from the working liquid feed inlet to the working liquid discharge outlet.

Figure 4:
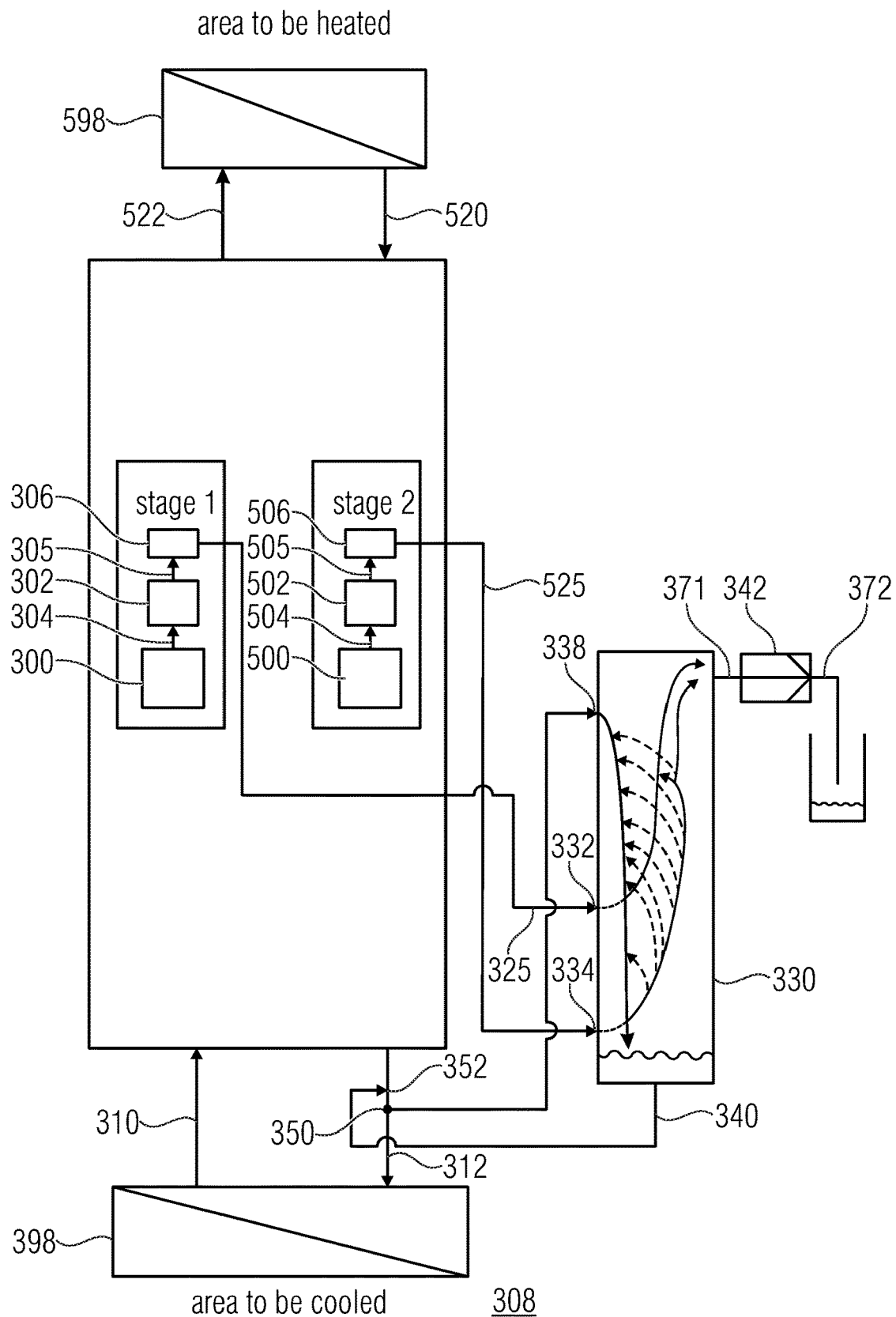
FIG. 4 shows a schematic representation of a system comprising two heat-pump stages (cans) in connection with a gas trap.

FIG. 4 shows an implementation of a heat pump having two stages. The first stage is formed by the evaporator 300, the compressor 302 and the condenser 306. The second stage is formed by an evaporator 500, a compressor 502 and a condenser 506. The evaporator 500 is connected to the compressor 502 via a vapor suction line 504, and the compressor 502 is connected to the condenser 506 via a line for compressed vapor, which is designated by 505. The system comprising the two (or more) stages includes a drain 522 and an intake 520. The drain 522 and the intake 520 are connected to a heat exchanger 598 which may be coupled to an area to be heated. Typically, this takes place on the customer's side, and the area to be heated typically is a heat sink, such as an exhaust-air means in the example of a cooling application, or a heating means in the example of a heating application.

In addition, the intake 310 leading into the system 300 and the drain 312 leading out of the system 300 are also coupled to a heat exchanger 398, which in turn may typically be couplable, on the customer's side, to an area to be cooled 308. In the example of a cooling application for the heat pump, the area to be cooled is a room to be cooled, such as a computer room, a process room, etc. In the example of a heating application for the heat pump, the area to be cooled would be, e.g., an environmental area, e.g., air in case of an air heat pump, ground in case of a heat pump with geothermal collectors, or a ground water/sea water/brine area from which heat is to be extracted for heating purposes.

Coupling between the two heat pump stages may take place as a function of the implementation. If coupling takes place such that one stage is a "cold" stage or a "cold can", as it were, the second stage will be the "warm" stage or "warm can", as it were. Said designations stem from the fact that the temperatures prevailing within the respective elements are colder in the first stage than in the second stage when both stages are in operation.

What is particularly advantageous about the present invention is the fact that the condensers of the second stage and of any further stages that may be present may all be connected to one and the same gas trap, or to one and the same gas trap housing 330. For example, FIG. 4 shows that the foreign gas feed line 325 of the first condenser 306 is coupled to the housing 330. In addition, a further foreign gas feed line 525 from the second condenser 506 is also coupled to the entrance 334. It is advantageous to couple the cold can, or the condenser of the cold can, i.e. of the first stage, for example, i.e. the condenser 306, further toward the top in the housing 330 of the gas trap than the condenser of the second stage, i.e. of the warm can. Thus, it is ensured that in the place where the largest foreign gas problems may occur, the path remaining within the gas trap for condensation and foreign gas accumulation is as long as possible. The working vapor, which is mixed with foreign gas, may take a longer time to flow, from the entrance 334, past the working liquid flow from the entrance 338 to the exit 340 than the flow consisting of working vapor and foreign gas from the foreign gas feed line 325. Depending on the implementation, however, all of the foreign gas feed lines may be coupled at the very bottom, i.e. via the single entrance 334, if the housing 330 leaves enough space for the gas trap here. In addition, FIG. 4 shows that the working liquid for the gas trap is bled off at the coldest location of the entire system consisting of two heat pump stages, namely at the drain 312 of the evaporator 300 of the first stage, which is coupled to the heat exchanger 398. Even though this is not depicted in FIG. 4, the pump 314 of FIG. 1B would typically be arranged between the branching 352 and the branching 350. Alternative embodiments may also be selected, however.

In addition, it shall be noted that the branching off of working liquid into the gas trap takes place in an amount of smaller than or equal to 1% of the main flow, i.e. of the entire flow from the evaporator 300 to the heat exchanger 398 and is advantageously even smaller than or equal to 1‰.

The same applies to the branching off of vapor from the condenser via the feed line 325 or 525. Here, the cross section of the line leading from the condenser into the housing 330 is typically configured such that at least 1% of the main gas flow is branched off into the condenser, or advantageously even less than or equal to 1‰ of the gas flow is branched off into the condenser. However, since the entire closed-loop control takes place automatically on the basis of the pressure difference from the respective condenser into the gas trap, precise dimensioning here is not critical to proper functioning here.

Figure 6:
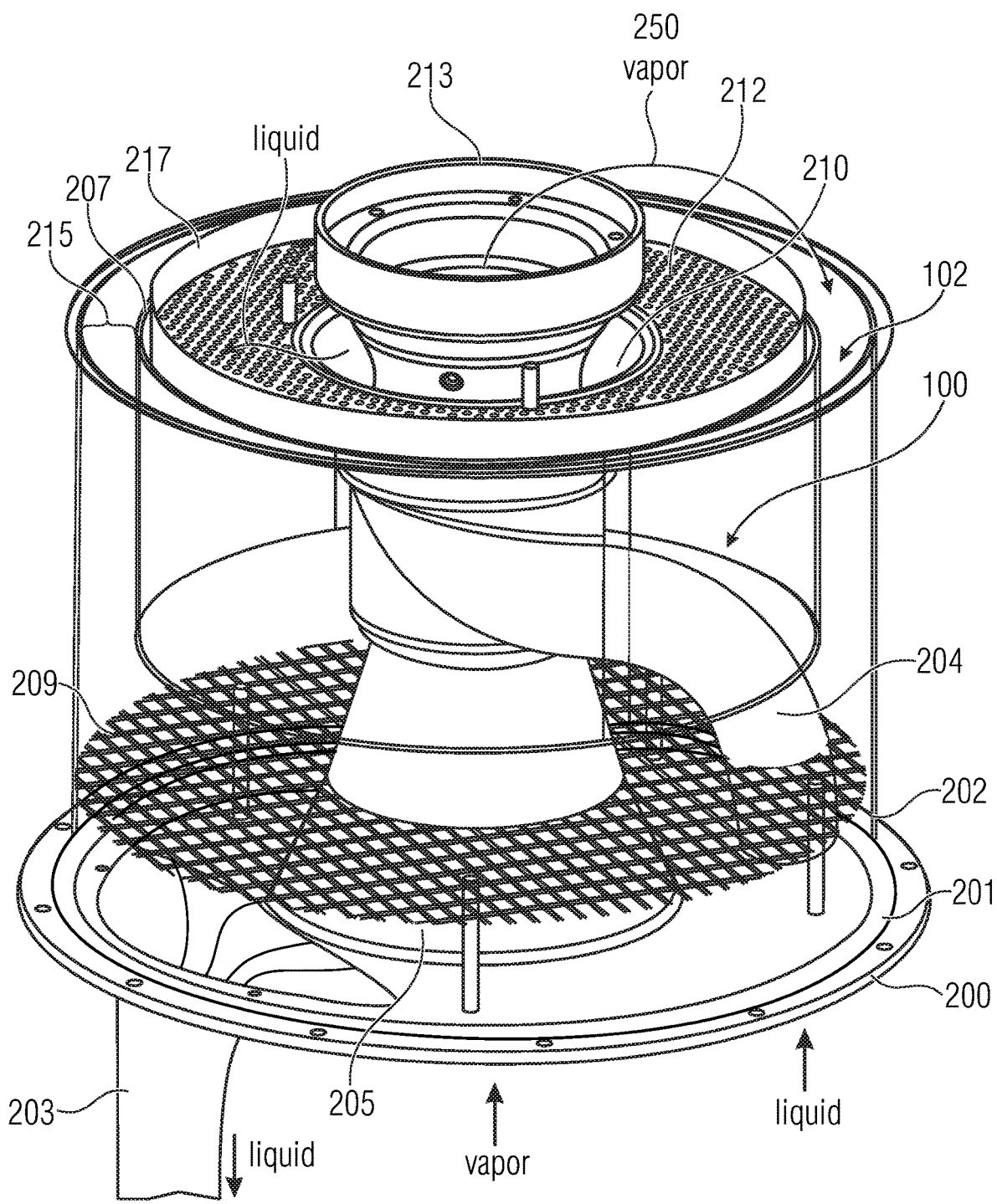
FIG. 6 shows a perspective representation of a condenser as shown in WO 2014072239 A1.

FIG. 6 shows a condenser, the condenser in FIG. 6 comprising a vapor introduction zone 102 extending completely around the condensation zone 100. In particular, FIG. 6 shows a part of a condenser which comprises a condenser base 200. The condenser base has a condenser housing portion 202 arranged thereon which is drawn to be transparent in the representation of FIG. 6 but in reality need not necessarily be transparent but may be formed from plastic, die-cast aluminum or the like. The lateral housing part 202 rests upon a rubber seal 201 so as to achieve good sealing with the base 200. Moreover, the condenser includes a liquid drain 203 and a liquid intake 204 as well as a vapor feed inlet 205 centrally arranged within the condenser and tapering from bottom to top in FIG. 6. It shall be noted that FIG. 6 represents the actually desired installation direction of a heat pump and of a condenser of said heat pump; in this installation direction in FIG. 6, the evaporator of a heat pump is arranged below the condenser. The condensation zone 100 is bounded toward the outside by a basket-like boundary object 207, which just like the outer housing part 202 is drawn to be transparent and is normally configured in a basket-like manner.

Moreover, a grid 209 is arranged which is configured to support fillers not shown in FIG. 6. As can be seen from FIG. 6, the basket 207 extends downward to a certain point only. The basket 207 is provided to be permeable to vapor so as to obtain fillers such as so called Pall rings, for example. Said fillers are introduced into the condensation zone, but only within the basket 207 and not within the vapor introduction zone 102. The fillers, however, are filled in to such a level, even outside the basket 207, that the height of the fillers extends either to the lower boundary of the basket 207 or slightly beyond.

The condenser of FIG. 6 includes a working liquid feeder which is formed—in particular by the working liquid feed inlet 204 which, as shown in FIG. 6, is arranged to be wound around the vapor feed inlet in the form of an ascending turn—by a liquid transport region 210 and by a liquid distributor element 212 which is advantageously configured as a perforated plate. In particular, the working liquid feeder is thus configured to feed the working liquid into the condensation zone.

In addition, a vapor feeder is also provided which, as shown in FIG. 6, is advantageously composed of the feeding region 205, which tapers in a funnel-shaped manner, and the upper vapor guiding region 213. Within the vapor guiding region 213, a wheel of a radial compressor is advantageously employed, and the radial compression results in that vapor is sucked from the bottom upward through the feed inlet 205 and is then redirected, on account of the radial compression, by the radial impeller (radial wheel) by 90 degrees to the outside, as it were, i.e. from flowing bottom-up to flowing from the center to the outside in FIG. 6 with regard to the element 213.

What is not shown in FIG. 6 is a further redirecting unit, which redirects the vapor that has already been redirected toward the outside by another 90 degrees so as to then direct it from above into the gap 215 which represents the beginning of the vapor introduction zone, as it were, which extends laterally around the condensation zone. The vapor feeder is therefore advantageously configured to be ring-shaped and provided with a ring-shaped gap for feeding the vapor to the condensed, the working liquid feed inlet being configured within the ring-shaped gap.

Figure 7:
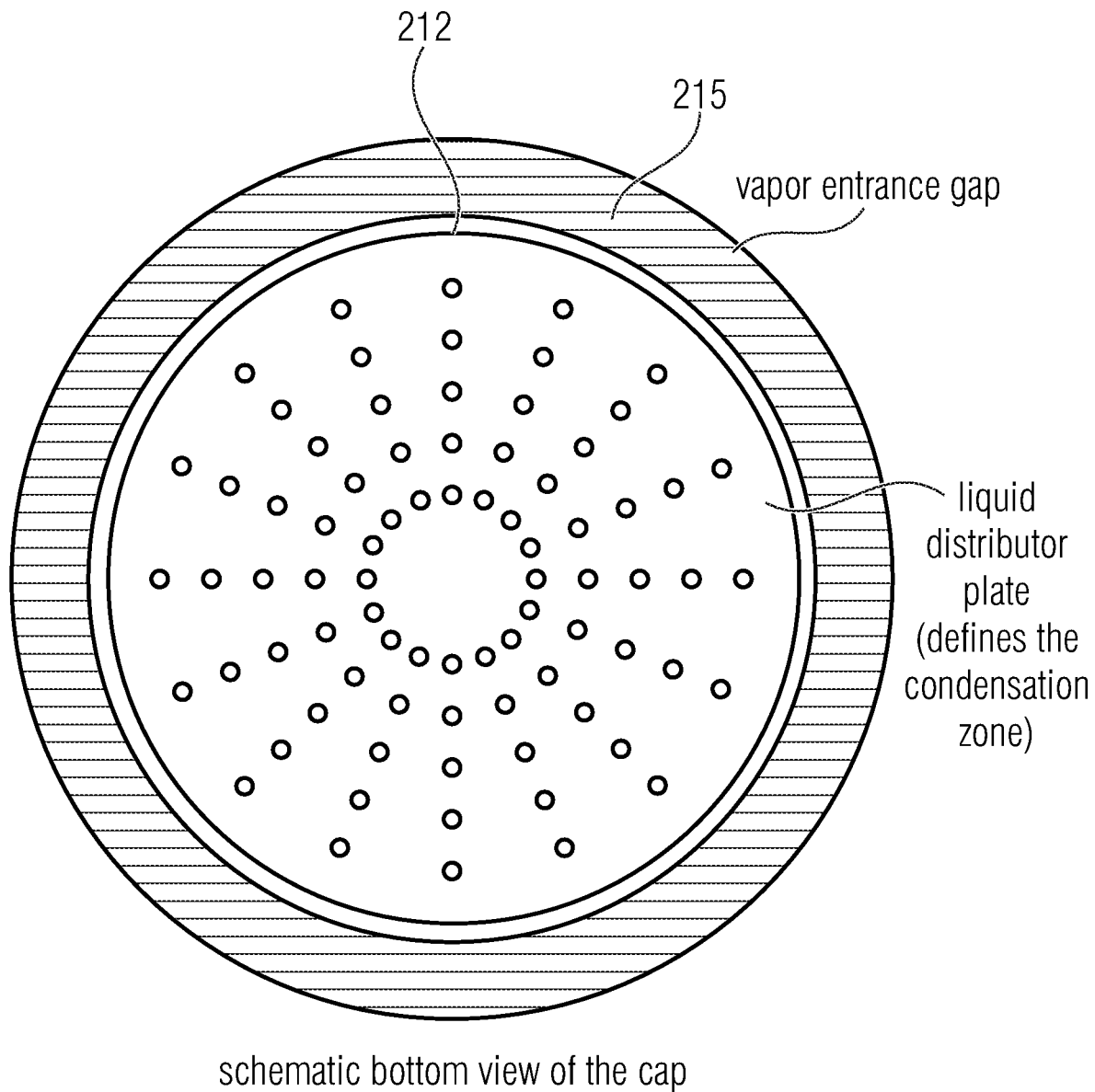
FIG. 7 shows a representation of the liquid distributor plate, on the one hand, and of the vapor entrance zone with a vapor entrance gap, on the other hand, from WO 2014072239 A1.
Figures 8A, 8B:
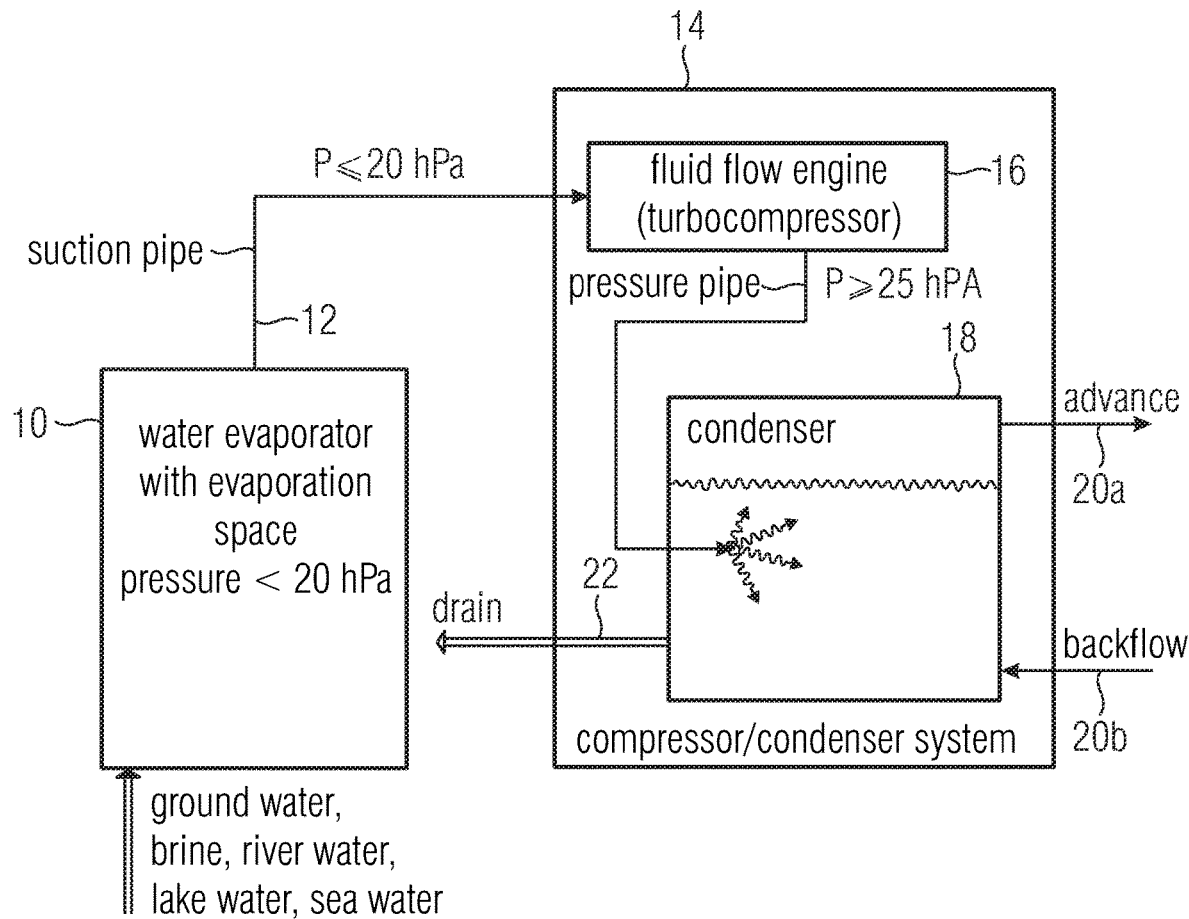
FIG. 8A shows a schematic representation of a known heat pump for evaporating water.
FIG. 8B shows a table for illustrating pressures and evaporation temperatures of water as a working liquid.

Please refer to FIG. 7 for illustration purposes. FIG. 7 shows a view of the "lid region" of the condenser of FIG. 6 from below. In particular, the perforated plate 212 which acts as a liquid distributor element is schematically depicted from below. The vapor entrance gap 215 is drawn schematically, and FIG. 7 shows that the vapor introduction gap is configured to be merely ring-shaped, such that vapor to be condensed is fed into the condensation zone neither directly from above nor directly from below, but is fed in from the sides all around only. Thus, only liquid, but no vapor, will flow through the holes of the distributor plate 212. The vapor is "sucked into" the condensation zone only from the sides, namely because of the liquid that has passed through the perforated plate 212. The liquid distributor plate may be formed from metal, plastic or a similar material and can be implemented with different hole patterns. As shown in FIG. 6, what is advantageously also to be provided is a lateral boundary for liquid flowing out of the element 210, said lateral boundary being designated by 217. In this manner it is ensured that liquid which exits the element 210 already with an angular momentum due to the curved feed inlet 204 and is distributed on the liquid distributor from the inside toward the outside will not splash over the edge into the vapor introduction zone, provided that the liquid has not previously dropped through the holes of the liquid distributor plate and has condensed with vapor.

Figure 5:
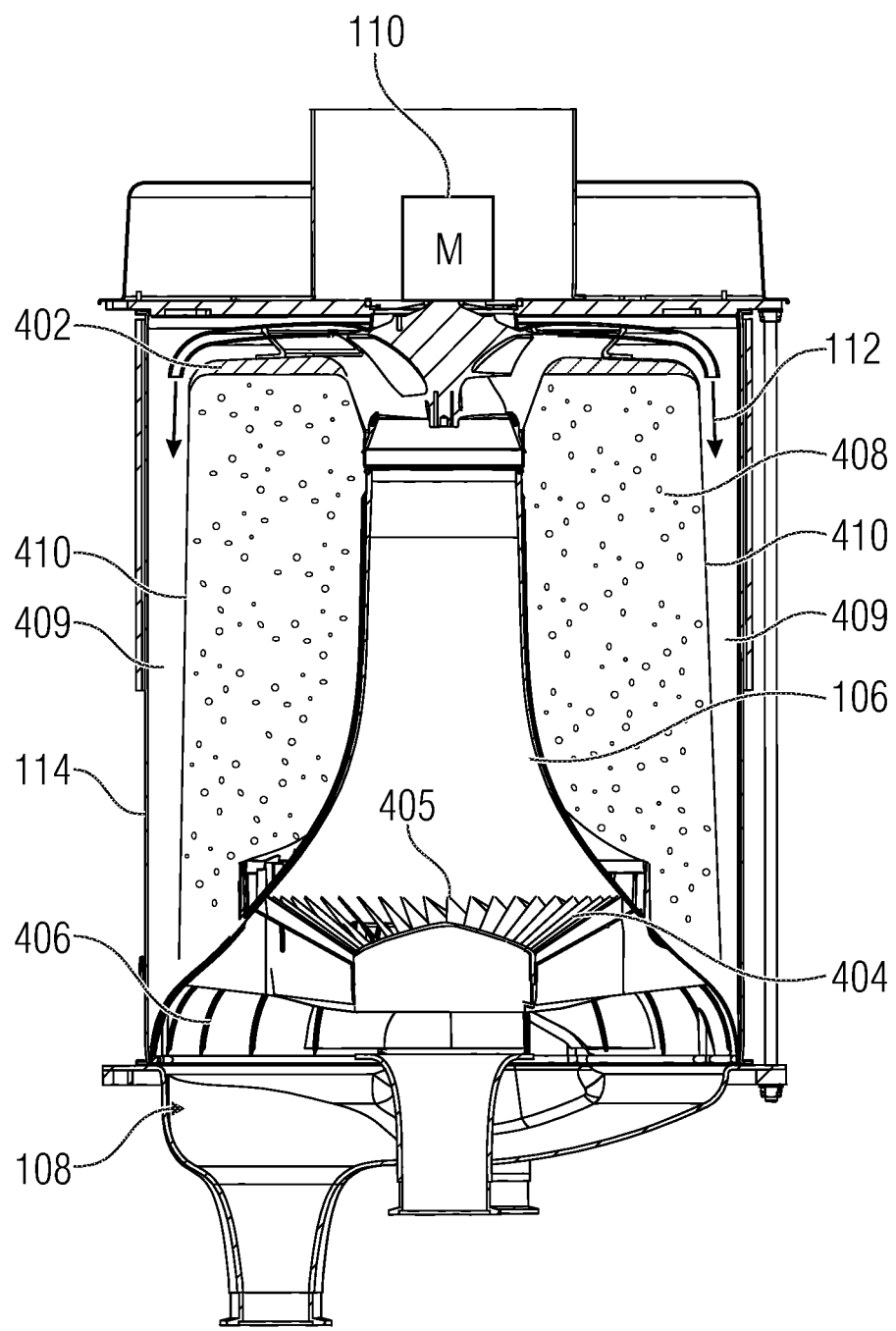
FIG. 5 shows a sectional view of a heat pump comprising an evaporator base and a condenser base in accordance with the embodiment of FIG. 1.

FIG. 5 shows a complete heat pump in a sectional representation including both the evaporator base 108 and the condenser base 106. As shown in FIG. 5 or also in FIG. 1, the condenser base 106 has a cross-section tapering from an intake for the working liquid to be evaporated to an exhaust opening 115 coupled to the compressor, or motor, 110, i.e., where the advantageously used radial impeller of the motor exhausts the vapor generated within the evaporator space 102.

FIG. 5 shows a cross-section through the entire heat pump. What is shown, in particular, is that a droplet separator 404 is arranged within the condenser base. Said droplet separator includes individual blades 405. So that the droplet separator remains in its position, said blades are inserted into corresponding grooves 406 which are shown in FIG. 5. Said grooves are arranged, within the condenser base, in a region pointing toward the evaporator base, on the inside of the evaporator base. In addition, the condenser base further has various guiding features which can be configured as small rods or tongues for holding hoses provided, e.g., for a condenser water guidance, i.e., which are placed onto corresponding portions and which couple the feeding points of the condenser water feed inlet. Said condenser water feed inlet 402 may be configured, depending on the implementation, such as is shown at reference numerals 102, 207 to 250 in FIGS. 6 and 7. In addition, the condenser advantageously has condenser liquid distribution means comprising two or more feeding points. A first feeding point is therefore connected to a first portion of a condenser intake. A second feeding point is connected to a second portion of the condenser intake. Should there be more feeding points for the condenser liquid distribution means, the condenser intake will be split up into further portions.

The upper region of the heat pump of FIG. 5 may thus be configured just like the upper region in FIG. 6, to the effect that feeding of the condenser water takes place via the perforated plate of FIG. 6 and FIG. 7, so that condenser water 408 trickling down is obtained into which the working vapor 112 is introduced advantageously in a lateral manner, so that cross-flow condensation, which allows a particularly high level of efficiency, can be obtained. As also depicted in FIG. 6, the condensation zone may be provided with a merely optional filling wherein the edge 207, which is also designated by 409, remains free from fillers or the like, to the effect that the working vapor 112 can still laterally enter into the condensation zone not only at the top, but also at the bottom. The imaginary boundary line 410 is to illustrate this in FIG. 5. However, in the embodiment shown in FIG. 5, the entire area of the condenser is configured with a condenser base 200 of its own, which is arranged above an evaporator base.

Figure 9:
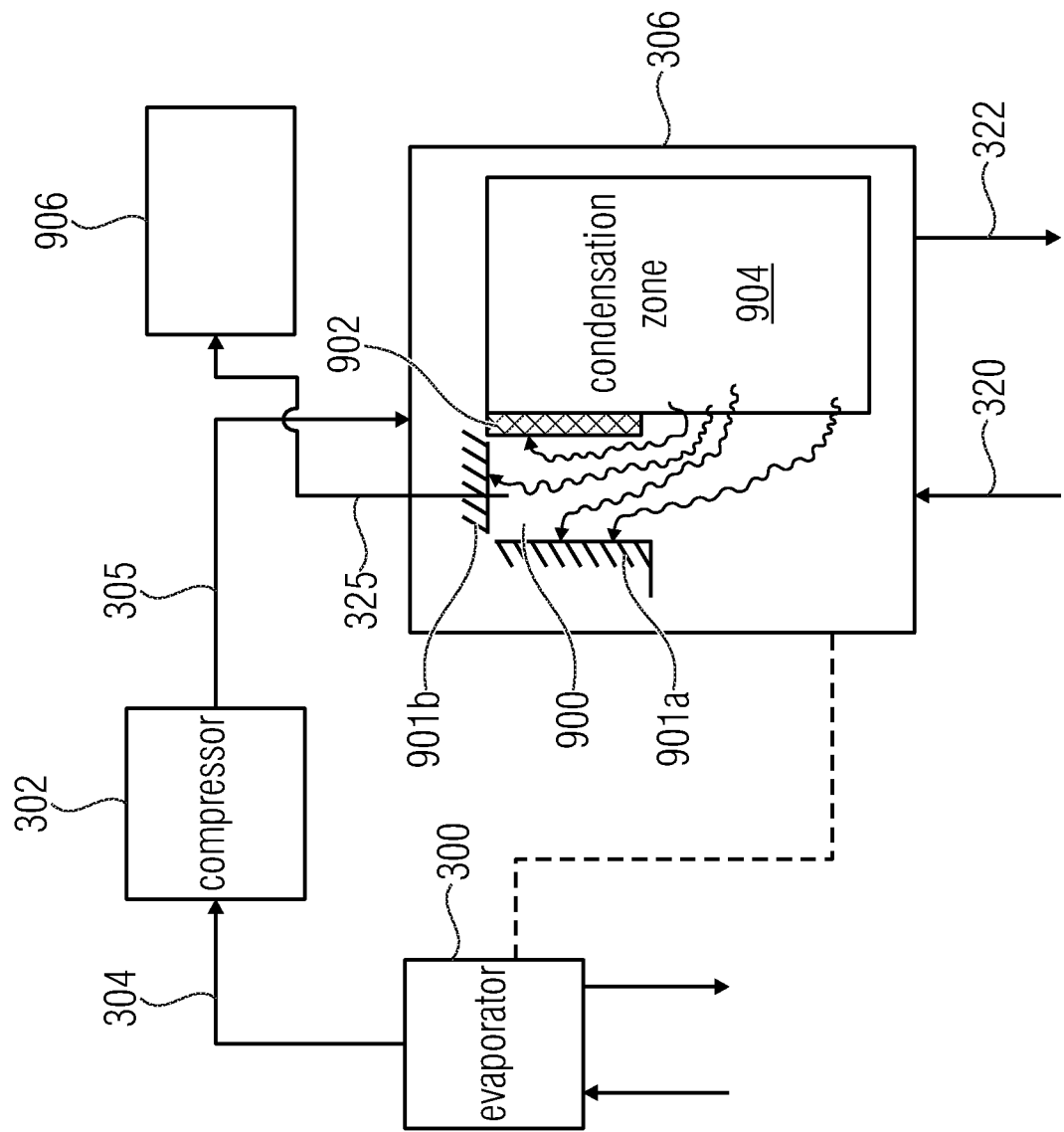
FIG. 9 shows a schematic representation of a heat pump comprising a foreign gas collection space within the condenser in accordance with an embodiment with regard to the second aspect of the present invention.

What will be described below with reference to FIG. 9 is a heat pump in accordance with the second aspect, which may be employed separately from or additionally to the first aspect which has been described so far. The heat pump in accordance with the second aspect includes a condenser 306 which may be configured in the same way as the above-described condenser for condensing heated and/or compressed working vapor which is fed to the condenser 306 via the line 305 for heated working vapor. The condenser 306 now includes, in accordance with the second aspect, a foreign gas collection space 900 arranged inside the condenser 306. The foreign gas collection space includes a condensation surface 901a, 901b, which during operation is colder than a temperature of the working vapor to be condensed. In addition, the foreign gas collection space 900 includes a partition wall 902 arranged, within the condenser 306, between the condensation surface 901a, 901b and a condensation zone 904. In addition, a foreign gas discharge device 906 is provided which is coupled to the foreign gas collection space 900 via the foreign gas feed line 325, for example, so as to discharge foreign gas from the foreign gas collection space 900. The foreign gas discharge device 906 includes, e.g., a combination of a pump, such as the pump 342, a suction line 371 and an ejection line 372 as is described in FIG. 1B. Then, suction from the foreign gas collection space would be effected directly toward the outside, as it were.

Alternatively, the foreign gas discharge device 906 is configured as a gas trap, comprising the housing and the feed inlets/discharge outlets as were described with regard to FIG. 1B, FIG. 2A, FIG. 2B, FIG. 3, FIG. 4. Then the foreign gas discharge device would also include the gas trap in addition to the pump 342, the suction line 371 and the ejection line 372. This would represent "indirect" discharge of foreign gas, as it were, wherein foreign gas which has already accumulated from the foreign gas collection space is initially brought into the gas trap together with the working vapor; within said gas trap, the accumulation of foreign gas is still increased by further condensation of working vapor for such time until suction takes place by means of the pump. The combination of the first and second aspects of the present invention thus presents a two-stage accumulation, as it were, of foreign gas, i.e. a first accumulation within the foreign gas collection space 900 and a second accumulation within the foreign gas accumulation space 358 of the gas trap of FIG. 1B, before foreign gas will then be drawn off. Alternatively, however, one-stage foreign gas accumulation may also take place, namely either through the foreign gas collection space 900 of FIG. 9 from which suction takes place directly, i.e. without any interposed gas trap having a gas trap housing 330 or, alternatively, by suction from the condenser 306 without the foreign gas collection space 900, as was described by means of FIG. 1B, for example.

However, on the grounds of optimum foreign gas accumulation and the simplifications associated therewith in terms of refilling and disposal of drawn-off working vapor, it is advantageous to select the two-stage variant, i.e. the combination of aspect 1 and aspect 2 of the present invention.

Figure 10:
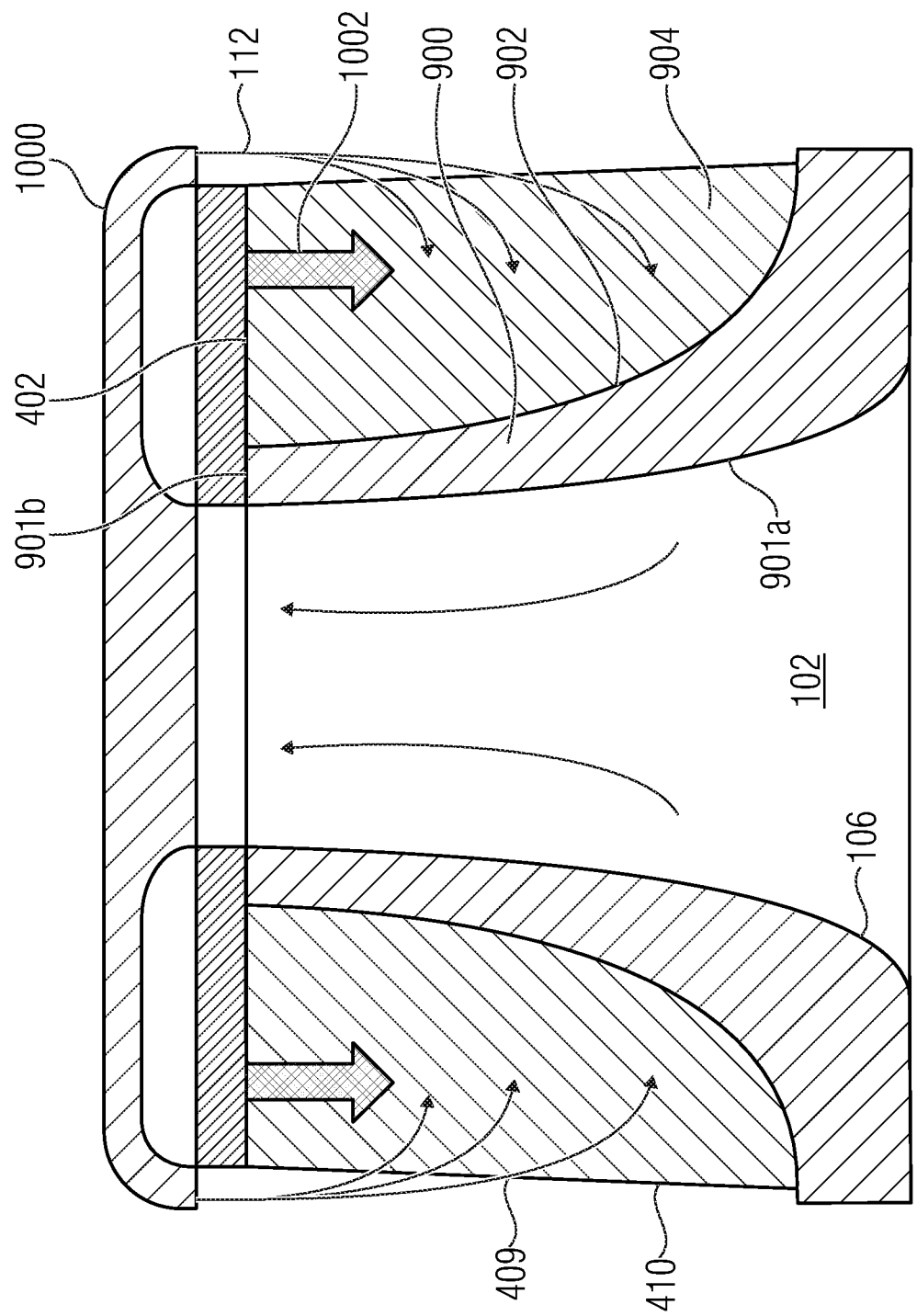
FIG. 10 shows a cross section through a heat pump having an interleaved evaporator/condenser arrangement.

FIG. 10 shows a schematic arrangement of a heat pump having an interleaved implementation as is depicted, e.g., in FIG. 1 and FIG. 5. In particular, the evaporator space 102 is arranged inside the condenser space 104. The vapor is fed into the condensation zone 904 in a lateral manner, as is shown at 112, via a vapor feed inlet 1000 once it has been compressed by a motor not shown in FIG. 10. In addition, a partition wall 902, which in the embodiment shown in FIG. 10 is roughly frustoconical, is shown in cross section, said partition wall 902 separating the condensation zone 904 from the condensation surface 106, which is formed by the condenser base, and from the further condensation surface 901b, which is formed by the water and/or condenser liquid feed inlet 402. Thus, the foreign gas collection space 900, which as compared to the ratios prevailing within the condensation zone 904 represents a steadied zone, results between the partition wall 902, on the one hand, and the surface 106, which also corresponds to the condensation surface 901a of FIG. 9, and the upper area 901b of the water feed inlet 402.

On the side facing the condenser, the partition wall 901a has a temperature below the saturated-vapor temperature prevailing within the condenser. In addition, on the side facing the evaporator, the partition wall 901a has a temperature above the saturated-vapor temperature prevailing there. Thus, it is ensured that the suction mouth, or vapor channel, is dry and that no water drops are present within the vapor, in particular when the compressor motor is activated. Thus, the impeller wheel is prevented from being damaged by drops present within the vapor.

In particular, the water vapor feed inlet allows water vapor 112 to flow in continuously, the orders of magnitude of water vapor flowing in typically being at least 1 liter per second. The pressure of the water vapor is equal to or higher than the resulting saturated-vapor pressure of the condenser water fed in through the water feed inlet 402, which condenser water is also designated by 1002 in FIG. 10. Here, typically at least 0.1 l/s of condenser working liquid 1002 are flowing in. The condenser liquid advantageously flows in or falls down in as turbulent a manner as possible, and the fed-in water vapor 112 already largely condenses into the moved water. The water vapor thus disappears in the water, and what remains is the foreign gas. The partition wall 902 discharges the condensed water and the water which has flown in toward the bottom while ensuring the steadied zone, which results in the foreign gas collection space 900. Said zone is formed below the partition wall 902. Here, foreign gas accumulation takes place.

Figure 11:
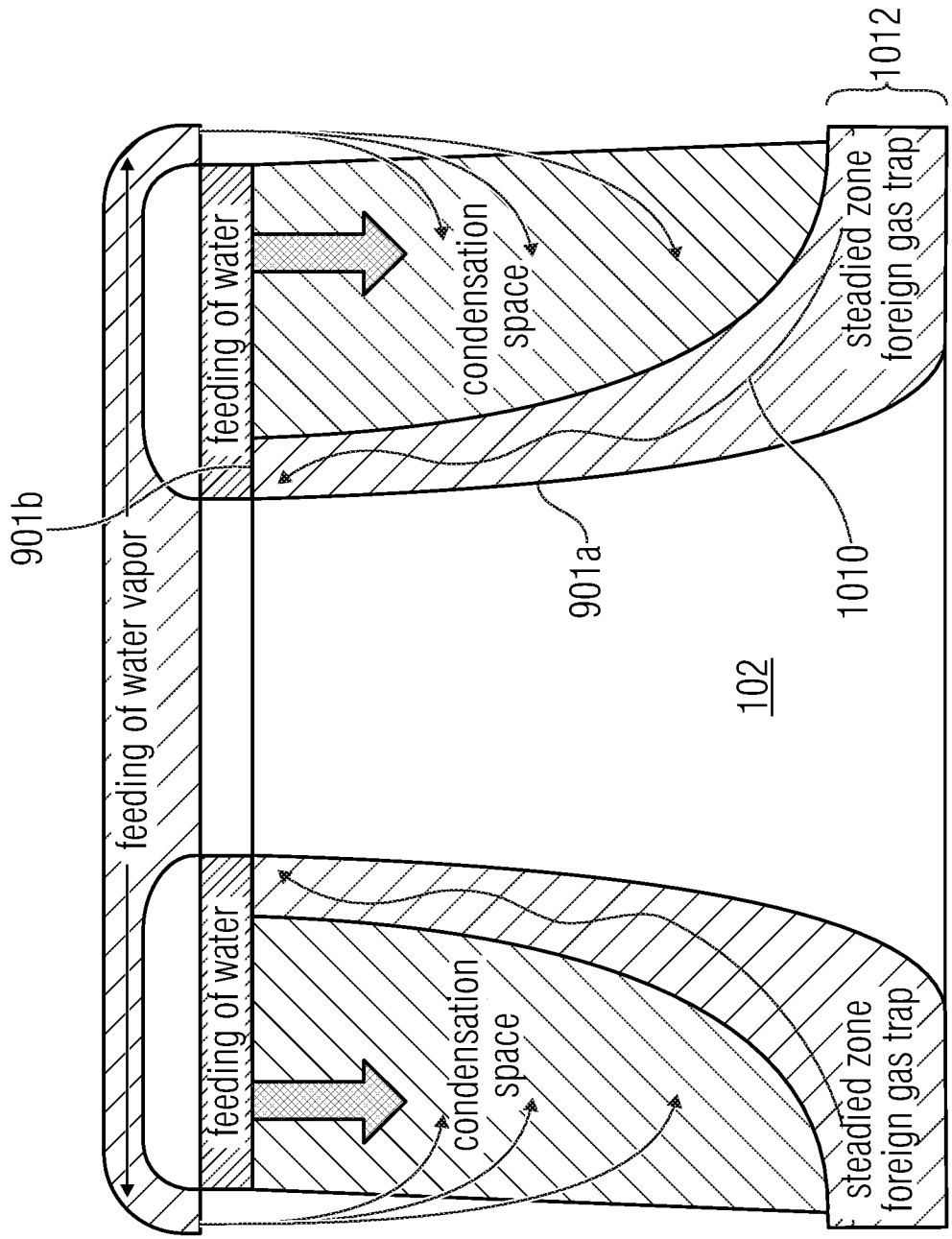
FIG. 11 shows a representation, similar to that of FIG. 10, for illustrating the functional principle.

A representation of functionality is shown in FIG. 11. What is shown here, in particular, is that a small part of the water vapor flows to the cold water vapor feed inlet 901b in order to condense there. Advantageously, said area 901b of the water feeding of the working liquid to be heated within the condenser, which working liquid may be, but need not necessarily be, water, is that place inside the condenser that is relatively cold. Said water vapor feed inlet is further advantageously formed of metal having high thermal conductivity, so that the small amount of water vapor 1010 which flows upward in the steadied space, i.e. within the foreign gas collection space, "sees" a "cold surface". At the same time, however, it shall be noted that the wall of the evaporator suction mouth, which is designated by 901a, is also relatively cold. Even though said wall is advantageously formed, for reasons of increased moldability, of plastic having a relatively poor coefficient of thermal conductivity, it is nevertheless the evaporator space 102 which is the almost coldest area of the entire heat pump. Thus, the water vapor 1010, which typically enters into the foreign gas collection space through a gap 1012, sees a cold sink also at the lateral wall 901a, which cold sink motivates the water vapor to condense. By means of said flow of water vapor, as is symbolized by the arrow 1010 in FIG. 11, foreign gas atoms are also introduced into the foreign gas collection space. Thus, the foreign gas is carried aloha and will accumulate within the entire steadied zone because it cannot condense.

If condensation stops, the proportion of foreign gas and, therefore, the partial pressure, will be higher. Then, or as early as condensation decreases, the foreign gas discharge device may discharge foreign gas, for example by means of a connected vacuum pump which performs suction from the steadied zone, i.e. from the foreign gas collection space. Said suction may be performed in a closed-loop controlled manner, in a continuous manner or in an open-loop controlled manner. Possible quantities to be measured are the pressure, the temperature at the point of condensation, a temperature difference between the water feed and the point of condensation, a driving pressure increase for the entire condensation process toward the water exit temperature, etc. All of said quantities may be used for closed-loop control. Open-loop control, however, may also be performed simply by means of a time interval controller which switches on the vacuum pump for a specific time period and then switches it off again.

Figure 12:
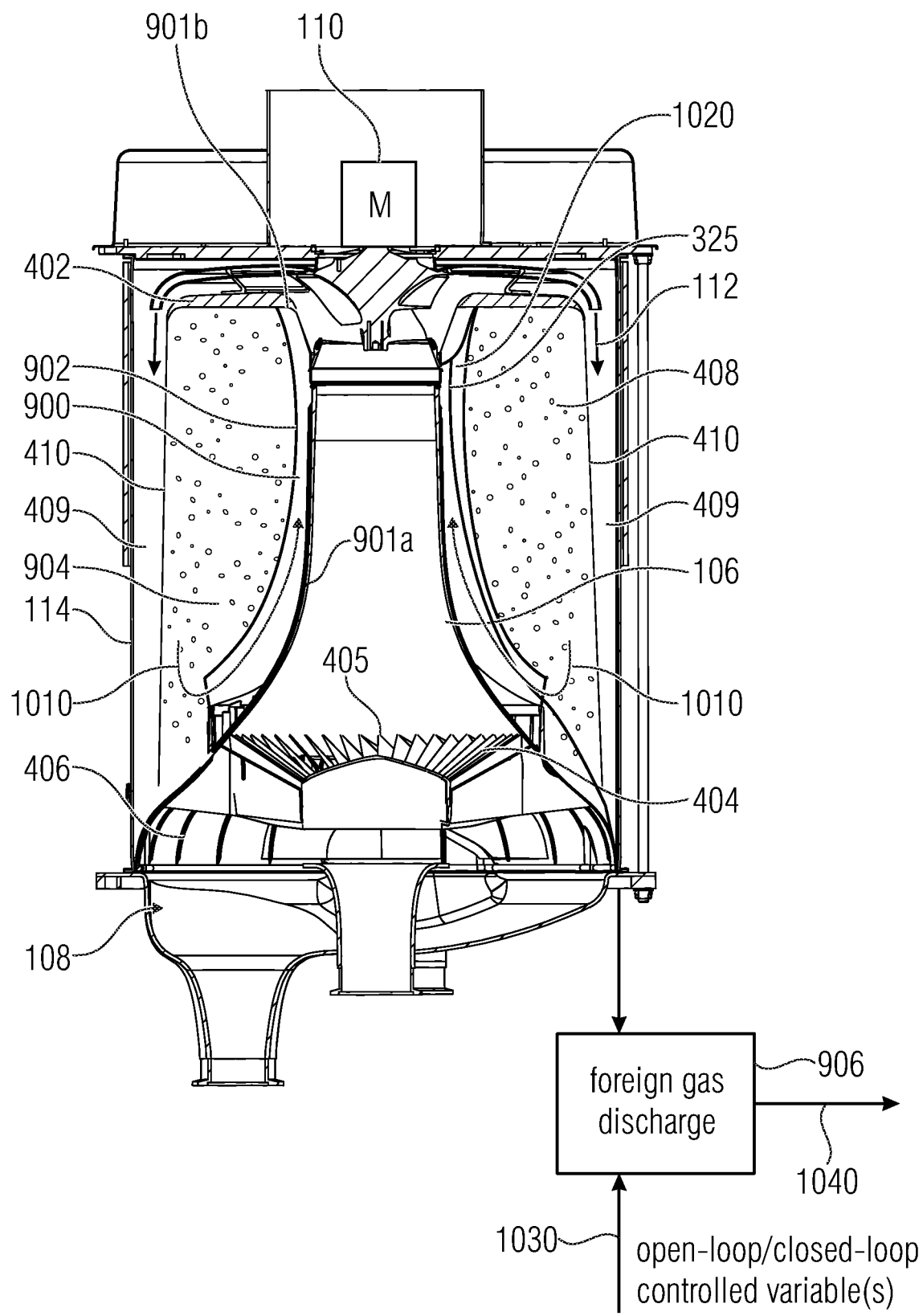
FIG. 12 shows a cross sectional representation of a heat pump having an interleaved evaporator/condenser arrangement and a frustoconical partition wall.

FIG. 12 shows a more detailed representation of a heat pump having a condenser comprising the partition wall, by means of the heat pump depicted in cross section in FIG. 5. In particular, the partition wall 902 again is depicted in cross section and separates the foreign gas collection space 900 from the condensation zone 408 or 904, so that a zone is provided, namely the foreign gas collection space 900, within which a "steadied climate" prevails as compared to the remaining condensation zone; the water vapor flow 1010 which simultaneously carries along foreign gas present within the condensation zone, enters into said "steadied climate". In addition, a hose 325 is provided as a suction means. The suction hose 325 is advantageously arranged at the top within the foreign gas collection space, as indicated at 1020, where the end of the hose is arranged within the foreign gas collection space. The walls of the foreign gas collection space are formed by the condensation surface 901a with regard to the one side, by the water feed portion 901b toward the top, and by the partition wall 902 with regard to the other side. The hose 325, i.e. the foreign gas discharge outlet, is advantageously led out through the evaporator base, but in such a manner that the hose is not led through the evaporator, where a particularly low pressure prevails, but past same. In addition, the condenser is configured such that a certain level of condenser liquid is present. However, said level is designed, in terms of its height, such that the partition wall 902 is spaced apart from the level by the gap 1012 of FIG. 11, so that the water vapor flow 1010 may enter into the foreign gas collection space.

Advantageously, the partition wall 902 is sealed toward the top in the embodiments depicted in FIGS. 9 to 12, so that the working liquid or "water" feed inlet 402 feeds working liquid into the condensation zone 904 only, but not into the steadied zone. In other embodiments, said sealing need not be particularly tight, however. A loose sealing, which serves the formation of the steadied zone, is sufficient. A zone within the foreign gas collection space which is steadied as compared to the condensation space is formed already by the fact that less working liquid is fed into the foreign gas collection space than into the condensation zone, so that the surroundings there are less turbulent than outside the partition wall. The water feed inlet might thus be formed such that some water is still fed into the foreign gas collection space so as to achieve efficient condensation of water vapor which, as is schematically drawn at 1010, flows into the foreign gas collection space while carrying along the foreign gas. However, the foreign gas collection space should be steady enough so that the foreign gas may accumulate there as well rather than being discharged again counter to the flow 1010 below the partition wall and again undesirably spreading within the condenser.

As is further shown in FIG. 12, the foreign gas discharge device 906 is configured to operate by means of corresponding open-loop/closed-loop controlled variables 1030 and to discharge accumulated foreign gas from the foreign gas collection space 900 toward the outside or into a further gas trap, as is indicated at 1040.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A heat pump comprising:
a condenser for condensing compressed working vapor;
a gas trap coupled to the condenser via a foreign gas feed inlet and comprising:
a housing comprising a foreign gas feed entrance;
a working liquid feed inlet into the housing; and
a working liquid discharge outlet from the housing; and
a gas pump for pumping off gas from the housing,
wherein the housing, the working liquid feed inlet and the working liquid discharge outlet are configured such that during operation of the heat pump, a working liquid flow takes place, within the housing, from the working liquid feed inlet to the working liquid discharge outlet,
wherein the working liquid feed inlet is coupled to the heat pump so as to direct, during operation of the heat pump, working liquid which is colder than a working vapor to be condensed within the condenser,
wherein the housing is arranged perpendicularly or obliquely in a direction of the operation of the heat pump, the working liquid feed inlet being arranged above the working liquid discharge outlet, and
wherein the foreign gas feed entrance is arranged below the working liquid feed inlet and above the working liquid discharge outlet.

2. The heat pump as claimed in claim 1, further comprising:
an evaporator for evaporating working liquid which comprises an intake for working liquid to be cooled and a drain for cooled working liquid,
wherein the working liquid feed inlet and the working liquid discharge outlet are both coupled to the intake leading into the evaporator or to the drain leading out of the evaporator, or wherein the working liquid feed inlet is coupled to the intake leading into the evaporator, and the working liquid discharge outlet is coupled to the drain leading out of the evaporator, or vice versa.

3. The heat pump as claimed in claim 2, wherein a liquid pump is arranged in the intake leading into the evaporator or in the drain leading out of the evaporator, and wherein it is downstream from the liquid pump that the working liquid feed inlet is connected to the intake of the evaporator, and it is upstream from the liquid pump that the working liquid discharge outlet is connected to the drain of the evaporator.

4. The heat pump as claimed in claim 1,
wherein an evaporator is provided which is coupled to a heat exchanger, the heat exchanger comprising an intake into an area to be cooled and a return flow from the area to be cooled,
the working liquid feed inlet and the working liquid discharge outlet both being coupled to the intake into the area to be cooled or to the return flow from the area to be cooled, or the working liquid feed inlet being coupled to the intake into the area to be cooled and the working liquid discharge outlet being coupled to the return flow from the area to be cooled, or vice versa.

5. The heat pump as claimed in claim 4, wherein a liquid pump is arranged within the intake leading into the area to be cooled or within a drain leading out of from the area to be cooled, and wherein the working liquid feed inlet is arranged downstream from the liquid pump, and the working liquid discharge outlet is arranged upstream from the liquid pump.

6. The heat pump as claimed in claim 1,
wherein the housing or the working liquid discharge outlet are configured to maintain, during the operation of the heat pump, a level of liquid working liquid within the housing above the working liquid discharge outlet, so that during the operation of the heat pump, an area of liquid working liquid is arranged between the foreign gas feed entrance and the working liquid discharge outlet, or
wherein the gas trap comprises a foreign gas accumulation space arranged above the working liquid feed inlet, and
the gas pump being coupled to the foreign gas accumulation space so as to pump the gas off from the foreign gas accumulation space, or
wherein the gas trap is configured such that working vapor from the foreign gas feed entrance may directly condense with the working liquid flow.

7. The heat pump as claimed in claim 1,
wherein the gas trap comprises a mediation element cooled by the working liquid flow, said mediation element being arranged within the housing such that working vapor from the foreign gas feed entrance may condense on a cooled surface of the mediation element,
wherein the mediation element is a pipe into which the working liquid feed inlet is introduced, and
wherein the pipe is open at its lower end and is immersed into a level of working liquid, so that working liquid that is condensed on a surface of the pipe flows into the level of working liquid.

8. The heat pump as claimed in claim 1,
wherein the housing is shaped to be elongated and is filled with fillers so as to achieve a turbulent working liquid flow during the operation of the heat pump.

9. The heat pump as claimed in claim 1,
wherein the housing and/or the working liquid discharge outlet is configured to maintain, during the operation of the heat pump, a level of liquid working liquid within the housing above the working liquid discharge outlet,
wherein an area of liquid working liquid is arranged between the foreign gas feed entrance and the working liquid discharge outlet during the operation of the heat pump, and wherein, during the operation of the heat pump, the working liquid flow and condensed working vapor, which is condensed due to the working liquid flow comprising a gas mixture of working liquid vapor and foreign gas, said gas mixture being feedable via the foreign gas feed entrance, flow into the level of liquid working liquid.

10. The heat pump as claimed in claim 1, further comprising:
a first heat pump stage comprising the condenser;
a second heat pump stage comprising a further condenser,
wherein the housing of the gas trap comprises a further foreign gas feed entrance coupled to the further condenser of the second heat pump stage.

11. The heat pump as claimed in claim 10,
wherein the first heat pump stage and the second heat pump stages are coupled to the area to be cooled and to an area to be heated such that during the operation of the heat pump, the further condenser of the second heat pump stage exhibits a temperature being higher than a temperature being present within the condenser of the first heat pump stage.

12. The heat pump as claimed in claim 10,
wherein the foreign gas feed inlet, which is coupled to the condenser of the first heat pump stage, is arranged, during the operation of the heat pump, above the further foreign gas feed entrance, which is coupled to the further condenser of the second heat pump stage via a second foreign gas feed entrance.

13. The heat pump as claimed in claim 1,
wherein the housing of the gas trap exhibits a length of at least 10 cm, or
wherein the housing is tubular and exhibits a diameter of at least 25 mm within an area of the working liquid flow and of at least 50 mm within a foreign gas accumulation space, or
wherein the gas trap is configured to exhibit a working liquid flow that is at least smaller than or equal to 1% of a main flow from an evaporator or is at least smaller than or equal to 1% of a main flow into the evaporator, or
wherein the working liquid feed inlet is coupled to the heat pump so as to conduct, during the operation of the heat pump, working liquid that is colder than a temperature which belongs to a saturated-vapor pressure of a working vapor that is to be condensed within the condenser, or
wherein the gas trap comprises a cooling area through which the working liquid flows, the working liquid which flows past being cooled within the cooling area.

* * * * *